(12) United States Patent
Singal et al.

(10) Patent No.: US 11,601,360 B2
(45) Date of Patent: *Mar. 7, 2023

(54) AUTOMATED LINK AGGREGATION GROUP CONFIGURATION SYSTEM

(71) Applicant: Dell Products L.P., Round Rock, TX (US)

(72) Inventors: Pawan Kumar Singal, Milpitas, CA (US); Balaji Rajagopalan, Sunnyvale, CA (US); Joseph LaSalle White, San Jose, CA (US); Kevin Kiyoshi Matsuo, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 149 days.

This patent is subject to a terminal disclaimer.

(21) Appl. No.: 17/098,635

(22) Filed: Nov. 16, 2020

(65) Prior Publication Data
US 2021/0067437 A1    Mar. 4, 2021

Related U.S. Application Data

(63) Continuation of application No. 16/263,431, filed on Jan. 31, 2019, now Pat. No. 10,862,794.

(51) Int. Cl.
*H04L 45/24* (2022.01)
*H04L 49/25* (2022.01)
(Continued)

(52) U.S. Cl.
CPC .......... *H04L 45/245* (2013.01); *H04L 45/586* (2013.01); *H04L 45/64* (2013.01);
(Continued)

(58) Field of Classification Search
CPC ..... H04L 45/245; H04L 45/586; H04L 45/64; H04L 45/66; H04L 49/102; H04L 49/25
(Continued)

(56) References Cited

U.S. PATENT DOCUMENTS 9,660,901 B2    5/2017 Sivasankar et al.
2013/0194914 A1    8/2013 Agarwal et al.
(Continued)

FOREIGN PATENT DOCUMENTS

EP    3217607 A1    9/2017

*Primary Examiner* — Christopher R Crompton
(74) *Attorney, Agent, or Firm* — Joseph Mencher

(57) ABSTRACT

An automated Link Aggregation Group (LAG) configuration system includes a plurality of slave switch devices that are each coupled to an endhost device by at least one respective link. Each of the plurality of slave switch devices receives a Link Aggregation Group (LAG) communication from the endhost device, and forwards endhost device information in that LAG communication to a master switch device. The master switch device receives endhost device information from each of the plurality of slave switch devices and determines that each of the plurality of slave switch devices are coupled to the endhost device. In response, the master switch device sends a LAG instruction to each of the plurality of slave switch devices that causes the at least one respective link that couples each of the plurality of slave switch devices to the endhost device to be configured in a LAG.

20 Claims, 14 Drawing Sheets

(51) Int. Cl.
  *H04L 45/64*   (2022.01)
  *H04L 45/586*  (2022.01)
  *H04L 45/00*   (2022.01)
  *H04L 49/102*  (2022.01)

(52) U.S. Cl.
  CPC ............ *H04L 45/66* (2013.01); *H04L 49/102* (2013.01); *H04L 49/25* (2013.01)

(58) Field of Classification Search
  USPC ........................................................ 370/254
  See application file for complete search history.

(56) References Cited

U.S. PATENT DOCUMENTS

| | | | |
|---|---|---|---|
| 2013/0315097 A1* | 11/2013 | Yang | ................... H04L 41/0886 370/254 |
| 2014/0025736 A1 | 1/2014 | Wang et al. | |
| 2014/0185461 A1 | 7/2014 | Gautreau et al. | |
| 2014/0269255 A1 | 9/2014 | Zeng et al. | |
| 2015/0381474 A1 | 12/2015 | Ao et al. | |
| 2016/0234091 A1 | 8/2016 | Emmadi et al. | |
| 2017/0063672 A1 | 3/2017 | Chhabra et al. | |
| 2017/0195199 A1 | 7/2017 | Dorai et al. | |
| 2017/0310548 A1 | 10/2017 | Jailani | |

\* cited by examiner

AUTOMATED LINK AGGREGATION GROUP CONFIGURATION SYSTEM

CROSS-REFERENCE TO RELATED APPLICATIONS

The present disclosure is a continuation of U.S. patent application Ser. No. 16/263,431, filed on Jan. 31, 2019, the disclosure of which is incorporated herein by reference in its entirety.

BACKGROUND

The present disclosure relates generally to information handling systems, and more particularly to automatically configuring a link aggregation group to provide for the transfer of data between information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices, are often configured to provide switching fabrics. However, the configuration and management of conventional switching fabrics is associated with complexity, ongoing operational overhead, and relatively long times required for new system deployment. Software Defined Networking (SDN) techniques have been developed to alleviate some of the management and control issues associated with conventional switching fabrics, but are still associated with complex configuration operations and relatively long configuration times. In addition, such techniques require a device external to the switching fabric (e.g., a server device upon which an SDN controller operates in order to manage and control SDN switch devices in the switching fabric) in order to provide for management and control of the switching fabric, which increases the cost of managing and controlling the switching fabric. As such, conventional switching fabric configuration techniques increase the overhead associated with performing management and control operations on switch devices in that switching fabric including, for example, configuring Link Aggregation Groups (LAGs) that provide for communication between switch devices in the switching fabric and endhost devices coupled to that switching fabric.

Accordingly, it would be desirable to provide an improved switching fabric that provides for automated LAG configuration.

SUMMARY

According to one embodiment, an Information Handling System (IHS) includes a processing system; and a memory system that is coupled to the processing system and that includes instructions that, when executed by the processing system, cause the processing system to provide an auto-Link Aggregation Group (LAG) configuration engine that is configured to: receive, from each of a plurality of slave switch devices, endhost device information received in respective LAG communications that were each generated and transmitted by an endhost device that is coupled to each of the plurality of slave switch devices via at least one respective link; determine, based on the endhost device information, that each of the plurality of slave switch devices are coupled to the endhost device; and send, to each of the plurality of slave switch devices, a LAG instruction that causes the at least one respective link that couples each of the plurality of slave switch devices to the endhost device to be configured in a LAG.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
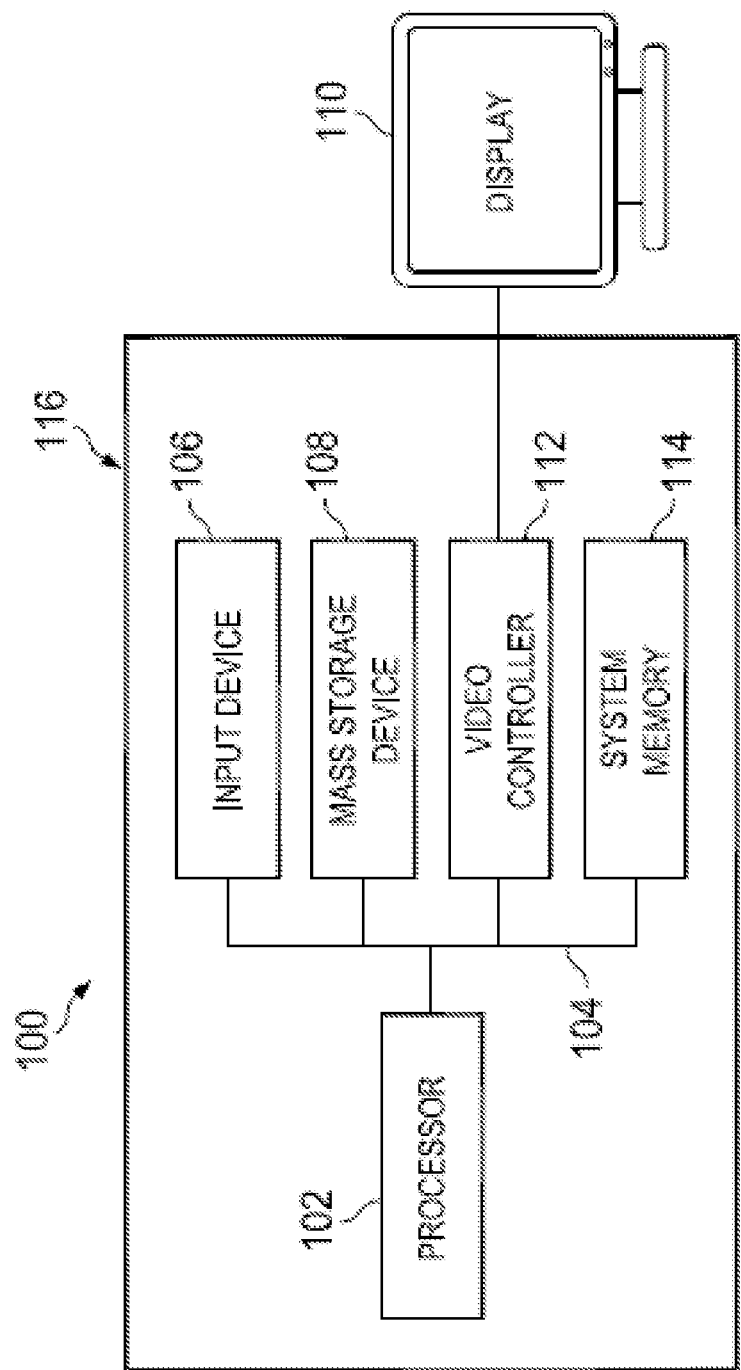
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
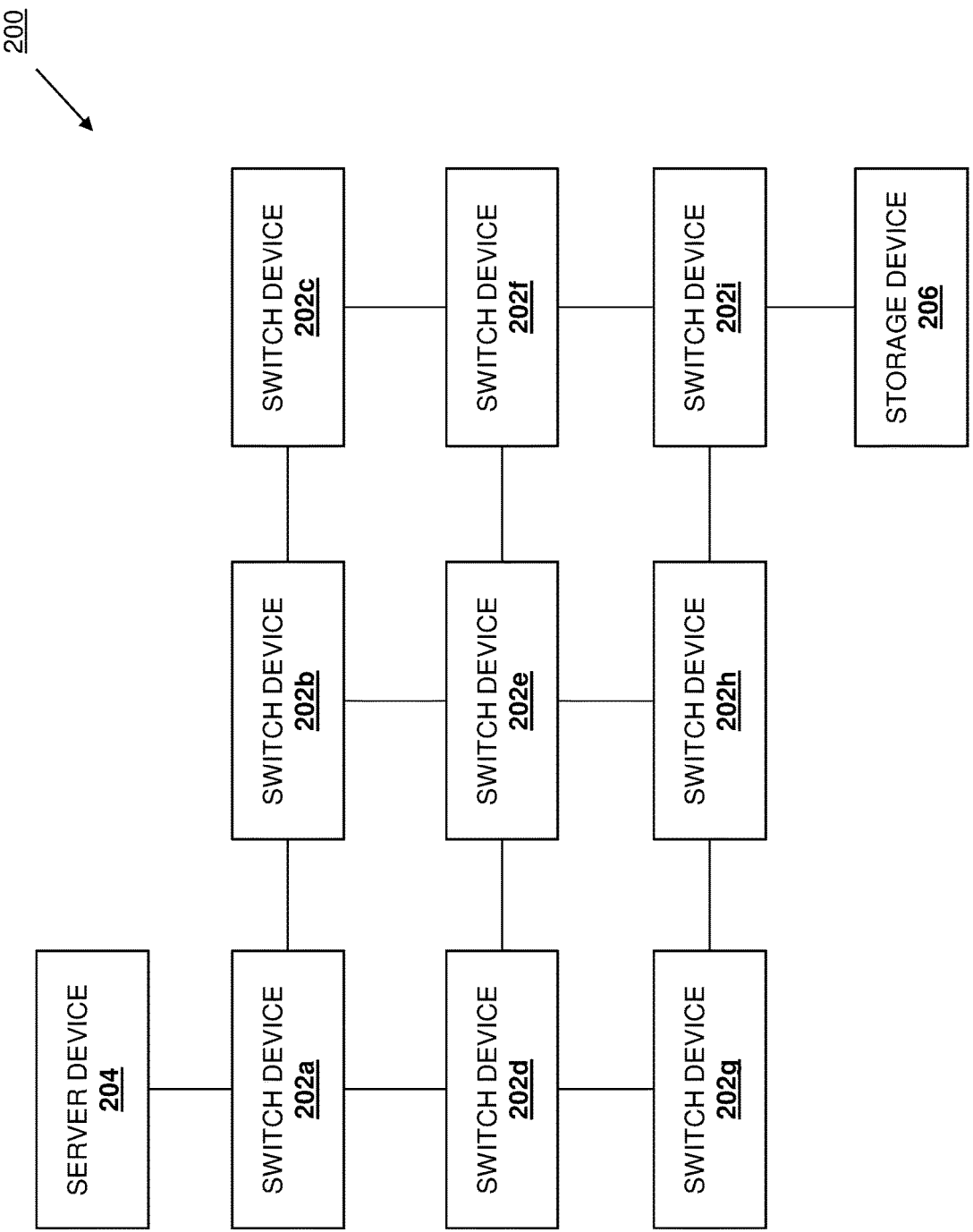
FIG. 2 is a schematic view illustrating an embodiment of a switching fabric configuration and management system.

Referring now to FIG. 2, an embodiment of a switching fabric configuration and management system 200 is illustrated. In the illustrated embodiment, the switching fabric configuration and management system 200 incudes a plurality of networking devices such as, for example, the switch devices 202a, 202b, 202c, 202d, 202e, 202f, 202g, 202h, and 202i, illustrated in FIG. 2. In an embodiment, any or all of the switch devices 202a-i may be provided by the IHS 100 discussed above with reference to FIG. 1, and/or may include some or all of the components of the IHS 100. However, while illustrated and discussed as switch devices, one of skill in the art in possession of the present disclosure will recognize that a variety of networking devices may provide in the switching fabric configuration and management system 200 of the present disclosure, and any devices that may be configured to operate in a fabric similarly as discussed for the switching fabric described below may benefit from the teachings of the present disclosure as well. As would be understood by one of skill in the art in possession of the present disclosure, any of the switch devices 202a-i may be coupled to endhost device(s). For example, in the illustrated embodiment, the switch device 202a is coupled to an endhost device provided by a server device 204, and the switch device 202i is coupled to an endhost device provided by a storage device 206. Each of the server device 204 and storage device 206 may be provided by the IHS 100 discussed above with reference to FIG. 1, and/or may include some or all of the components of the IHS 100. However, one of skill in the art in possession of the present disclosure will recognize that many more endhost devices may (and typically will) be coupled to any of the switch devices 202a-i (e.g., a datacenter) while remaining within the scope of the present disclosure, and may be provided by a variety of compute/storage nodes known in the art. Furthermore, management devices and/or other devices may be provided as endhost devices while remaining within the scope of the present disclosure as well. While a specific switching fabric configuration and management system 200 has been illustrated and described, one of skill in the art in possession of the present disclosure will recognize that the switching fabric configuration and management system of the present disclosure may include a variety of components and component configurations while remaining within the scope of the present disclosure as well.

Figure 3:
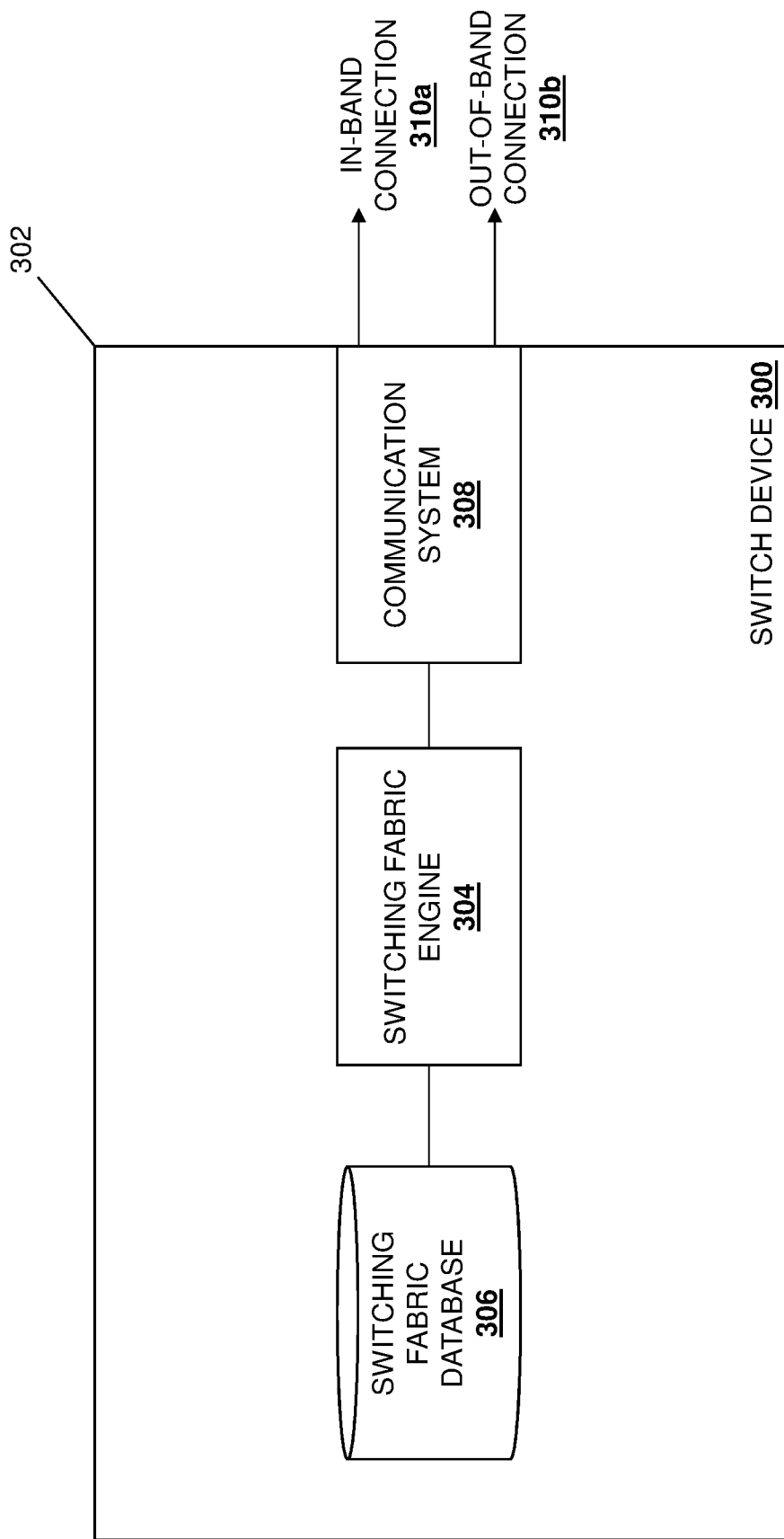
FIG. 3 is a schematic view illustrating an embodiment of a switch device that may be provided in the switching fabric configuration and management system of FIG. 2.

Referring now to FIG. 3, an embodiment of a switch device 300 is illustrated that may provide any or all of the switch devices 202a-i discussed above with reference to FIG. 2. As such, the switch device 300 may be provided by the IHS 100 discussed above with reference to FIG. 1 and/or may include some or all of the components of the IHS 100. Furthermore, while illustrated and discussed as a switch device, one of skill in the art in possession of the present disclosure will recognize that the functionality of the switch device 300 discussed below may be provided by other networking devices and/or other devices that are configured to operate in a fabric similarly as discussed for the switching fabric described below. In the illustrated embodiment, the switch device 300 includes a chassis 302 that houses the components of the switch device 300, only some of which are illustrated below.

For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a switching fabric engine 304 that is configured to perform the functionality of the switching fabric engines and/or switch devices discussed below. In a specific example, the switching fabric engine 304 may be provided, at least in part, by a Central Processing Unit (CPU) in the switch device 300 that is separate from a Network Processing Unit (NPU) in the switch device 300 that performs conventional switch device functions (e.g., data path determination and data path forwarding), and that may be included in instructions on the memory system that, when executed by the CPU, cause the CPU to provide the DELL® Operating System 10 (OS10) available from DELL® Inc., of Round Rock, Tex., United States, configures the NPU to perform the switch device functions, and/or performs a variety of other CPU functionality known in the art. Furthermore, at least some of the functionality of the switching fabric engine 304 may be provided by agent(s) included on the switch device 300.

The chassis 302 may also house a storage system (not illustrated, but which may include the storage 108 discussed above with reference to FIG. 1) that is coupled to the switching fabric engine 304 (e.g., via a coupling between the storage system and the processing system) and that includes a switching fabric database 306 that is configured to store any of the information utilized by the switching fabric engine 304 discussed below. The chassis 302 may also house a communication system 308 that is coupled to the switching fabric engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. As can be seen, the communication system 308 may provide either or both of an in-band connection 310a and an out-of-band connection 310b to, for example, the other switch devices, endhosts, management devices, and/or any other device that would be apparent to one of skill in the art in possession of the present disclosure. While a specific switch device 300 has been illustrated and described, one of skill in the art in possession of the present disclosure will recognize that switch devices (or other devices operating according to the teachings of the present disclosure in a manner similar to that described below for the switch device 300) may include a variety of components and/or component configurations for providing conventional switch device functionality, as well as the functionality discussed below, while remaining within the scope of the present disclosure as well.

Figure 4:
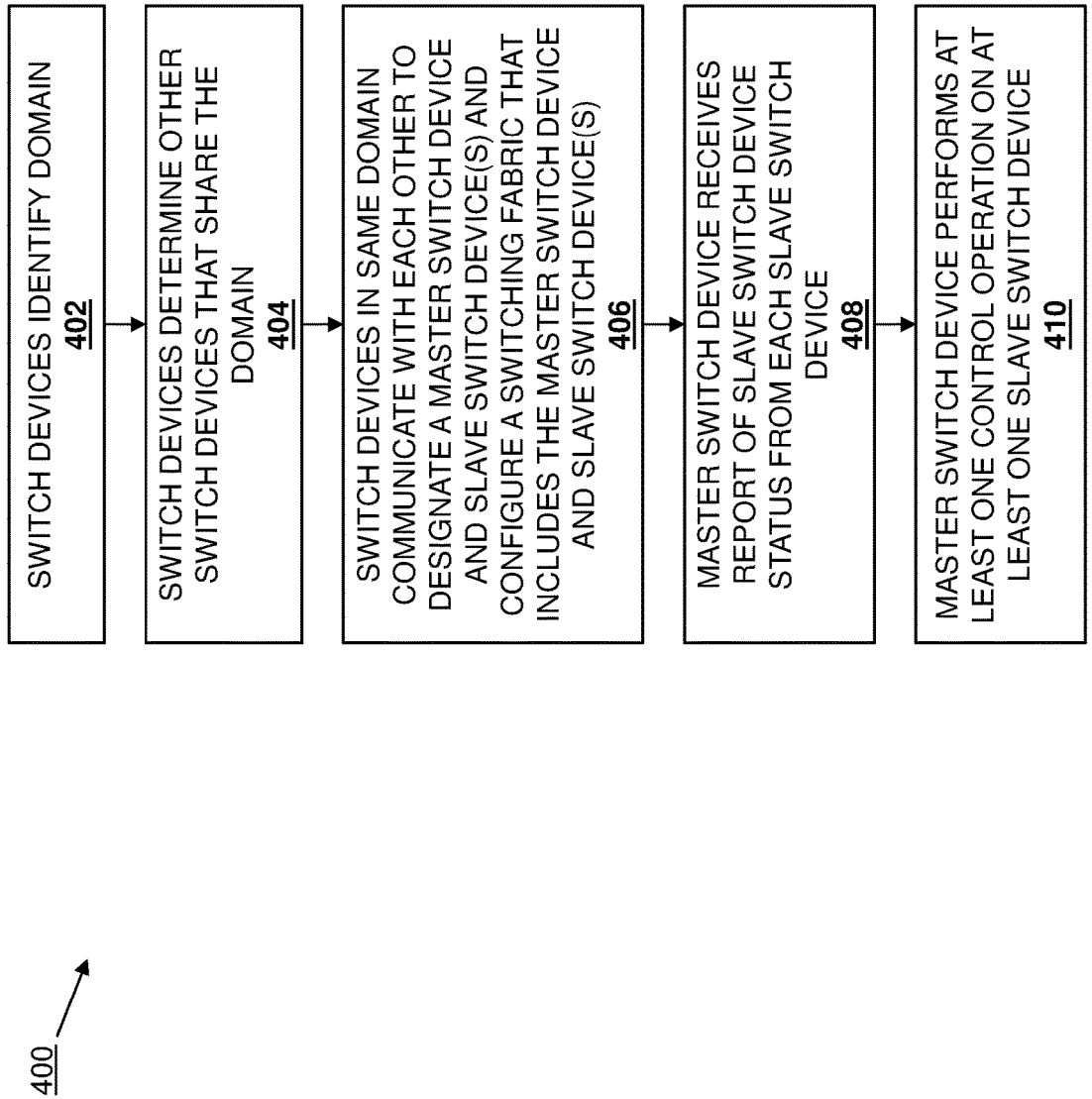
FIG. 4 is a flow chart illustrating an embodiment of a method for configuring and managing a switching fabric.

Referring now to FIG. 4, an embodiment of a method for configuring and managing a switching fabric is illustrated. As discussed below, the systems and methods of the present disclosure provide for the configuration of switching fabrics in a manner that reduces the complexity, ongoing operational overhead, and relatively long times required for new system deployment, as well as eliminates the need for to provide a device external to the switching fabric that performs the management and control functionality for the switching fabric, thus reducing the cost of managing and controlling the switching fabric. For example, the switching fabrics provided via the teachings of the present disclosure may only require a plurality of switch devices that operate to configure themselves into a switching fabric via communications that result in those devices discovering each other and forming a switch device cluster, and then electing one of those switch devices as a master switch device for the switch device cluster/switching fabric and the remaining switch devices as slave switch devices in the switch device cluster/switching fabric. Following the configuration of the switching fabric, the master switch device may perform control/management operations on any of the slave switch devices. Furthermore, the master switch device may share its master switch device configuration with each of the slave switch devices, which allows any of those slave switch devices to configure themselves as a master switch device in the event the switch device that is operating as the master switch device becomes unavailable. As such, in some embodiments, switching fabrics may be configured and managed without the need for an external device with a Central Processing Units (CPU), and may instead be configured and managed using the CPU in the switch devices that make up the switching fabric.

The method 400 begins at block 402 where switch devices identify a domain. In an embodiment, at or prior to block 402, each switch device that is to-be utilized to provide the switching fabric according to the teachings of the present disclosure may be provided a common domain identifier that identifies a common domain for those switch devices. For example, with reference to FIG. 2 and the examples provided below, each of the switch devices 202a-i are utilized to provide the switching fabric according to the teachings of the present disclosure, and a common domain identifier may be provided in the switching fabric database 306 included in each of those switch devices 202a-i/300. For example, a network administrator or other user of the switch devices 202a-i may provide the common domain identifier in the switching fabric database 306 of each of the switch devices 202a-i/300 in order to configure those switch devices 202a-i/300 for the switching fabric discussed below. However, while the use of a domain identifier in configuring the switching fabric of the present disclosure is described below, one of skill in the art in possession of the present disclosure will recognize that other switch device personality information (e.g., DELL® OS10 personality information) may be utilized to configure the switching fabric in manner similar to that described for the domain identifier below while remaining within the scope of the present disclosure as well.

As such, in some specific examples, the network administrator or other user may cable a management device to each switch device 300 (e.g., via a management port on the communication system 308), and use an input subsystem on the management device to log into each switch device 300 and provide the domain identifier to the switching fabric engine 304 for storage in the switching fabric database 306. However, in other specific examples, the network administrator or other user may use a management device to access each switch device 300 via a management network that is coupled to the communication system 308, and log into each switch device 300 to provide the domain identifier to the switching fabric engine 304 in each switch device 202a-i/300 for storage in the switching fabric database 306. While a few specific examples have been described, one of skill in the art in possession of the present disclosure will recognize that the common domain identifier may be provided in the switching fabric database 306 of each of the switch devices 202a-i/300 in a variety of manners that will fall within the scope of the present disclosure as well.

At block 402, the switching fabric engine 304 in each switch device 202a-i/300 may operate to access its switching fabric database 306 and identify the domain identifier stored therein. For example, at or prior to block 402, a network administrator or other user may couple together each of the switch devices 202a-i (e.g., via a variety of cabling and coupling techniques that would be apparent to one of skill in the art in possession of the present disclosure) and/or provide each of the switch devices 202a-i as part of a Local Area Network (LAN). Following the coupling together of the switch devices 202a-i, each of those switch devices 202a-i may be powered on, booted, and/or otherwise initialized and, in response, the switching fabric engine 304 in each switch device 202a-i/300 may operate to access its switching fabric database 306 and identify the domain identifier that was provided as discussed above. However, while a specific example has been described, one of skill in the art in possession of the present disclosure will recognize that a switch device may identify a domain identifier (and a corresponding domain in which that switch device belongs) in a variety of manners that will fall within the scope of the present disclosure as well. As such, following block 402, each switch device 202a-i may have identified the domain to which it belong, as per an assignment by a network administrator or other user of a common domain to each switch device that is to provide the switching fabric of the present disclosure.

The method 400 then proceeds to block 404 where the switch devices determine other switch devices that share the domain. In an embodiment, at block 404, the switching fabric engine 304 in each switch device 202a-i/300 may operate to transmit its domain identifier that was identified at block 402 to at least some of the other switch devices 202a-i/300. As discussed above, the switch devices 202a-i/300 may be part of a LAN, and the switching fabric engine 304 in each switch device 202a-i/300 may transmit its domain identifier over a Virtual LAN (VLAN) provided on that LAN. As such, at block 404 the switch devices 202a-i/300 may exchange their domain identifiers, and the switching fabric engine 304 in each switch device 202a-i/300 may operate to determine the switch devices that share its domain when it receives a domain identifier from those switch devices that matches its domain identifier. While the exchange of domain identifiers between switch devices to allow each of those switch devices to determine that they share a domain with the other switch devices has been described, one of skill in the art in possession of the present disclosure will recognize that switch devices may determine that they share a domain using a variety of techniques that will fall within the scope of the present disclosure as well.

The method 400 then proceeds to block 406 where the switch devices in the same domain communicate with each other to designate a master switch device and slave switch devices, and configure a switching fabric that includes the master switch device and the slave switch device. In an embodiment, at block 406, the switching fabric engine 304 in each switch device 202a-i/300 that was determined to share a domain at block 404 may operate to communicate with each other to designate a master switch device and slave switch devices. For example, the switching fabric engine 304 in each switch device 202a-i/300 that was determined to share a domain at block 404 may communicate using the Virtual Router Redundancy Protocol (VRRP) in order to designate the master switch device and slave switch devices at block 406. One of skill in the art in possession of the present disclosure will recognize that the VRRP is a computer networking protocol that is conventionally used to provide for the automatic assignment of available Internet Protocol (IP) router devices to participating host devices in order to increase the availability and reliability of routing paths via automatic default gateway selections on an IP network, and operates to create virtual router devices (e.g., abstractions of multiple router devices) that include a master router device and slave/backup router devices that operate as a group.

As such, one of skill in the art in possession of the present disclosure will recognize how the switching fabric engine 304 in each switch device 202a-i/300 that was determined to share a domain at block 404 may communicate using the VRRP in order to designate a master switch device and slave switch devices. For example, the communications between the switching fabric engine 304 in each switch device 202a-i/300 using the VRRP in order to designate a master switch device and slave switch devices may include the exchange of IP addresses and the election of the switch device having the lowest IP address as the master switch device, which results in the remaining switch devices being designated as slave switch devices. In some embodiments, the designation of the master switch device may include that master switch device being assigned a unique master switch device IP address that, as discussed below, may be utilized by the slave switch devices to communicate with the master switch device.

Figure 5:
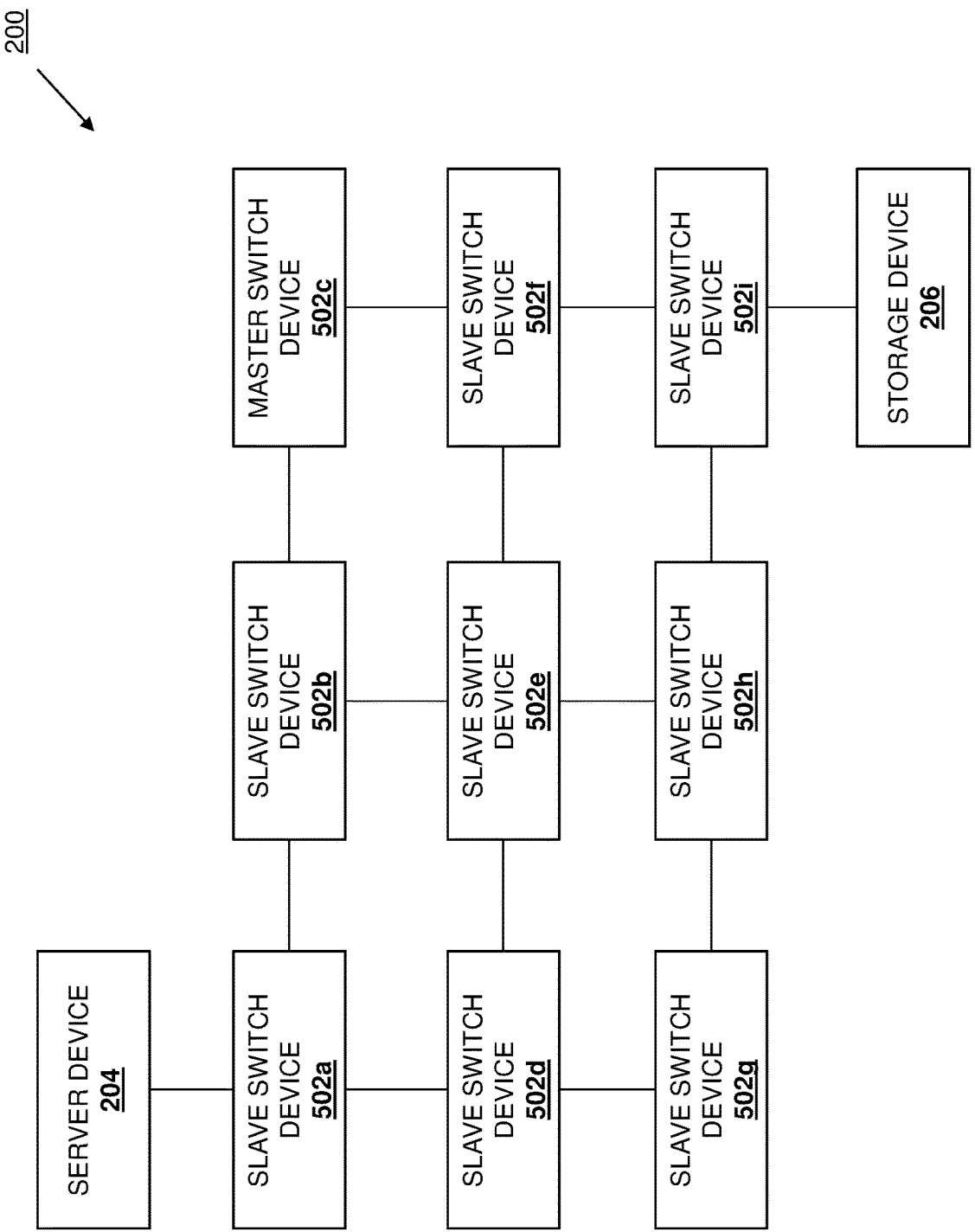
FIG. 5 is a schematic view illustrating an embodiment of the switching fabric configuration and management system of FIG. 2 during the method of FIG. 4.

With reference to FIG. 5, an embodiment of the switching fabric configuration and management system 200 discussed above with reference to FIG. 2 is illustrated following the designation of the master switch device and the slave switch devices at block 406. For example, in the embodiment illustrated in FIG. 5 and with reference to FIG. 2, the switch device 202c has been designated as a master switch device 502c, while the switch devices 202a, 202b, and 202d-i have been designated as slave switch devices 502a, 502b, and 502d-i, respectively. In a specific example, at block 406, at least some of the functionality of the switching fabric engine 304 in each switch device 202a-i/300 that allows for the designation of the master switch device and slave switch devices at block 406 may be provided by Keepalived routing software, available from www.keepalived.org, which one of skill in the art in possession of the present disclosure will recognize uses the VRRP. However, while a specific software and protocol has been discussed as being used to designate the master switch device and slave switch devices of the present disclosure, one of skill in the art in possession of the present disclosure will recognize that the master switch device and slave switch devices may be designated in a variety of manners that will fall within the scope of the present disclosure as well.

Figure 6:
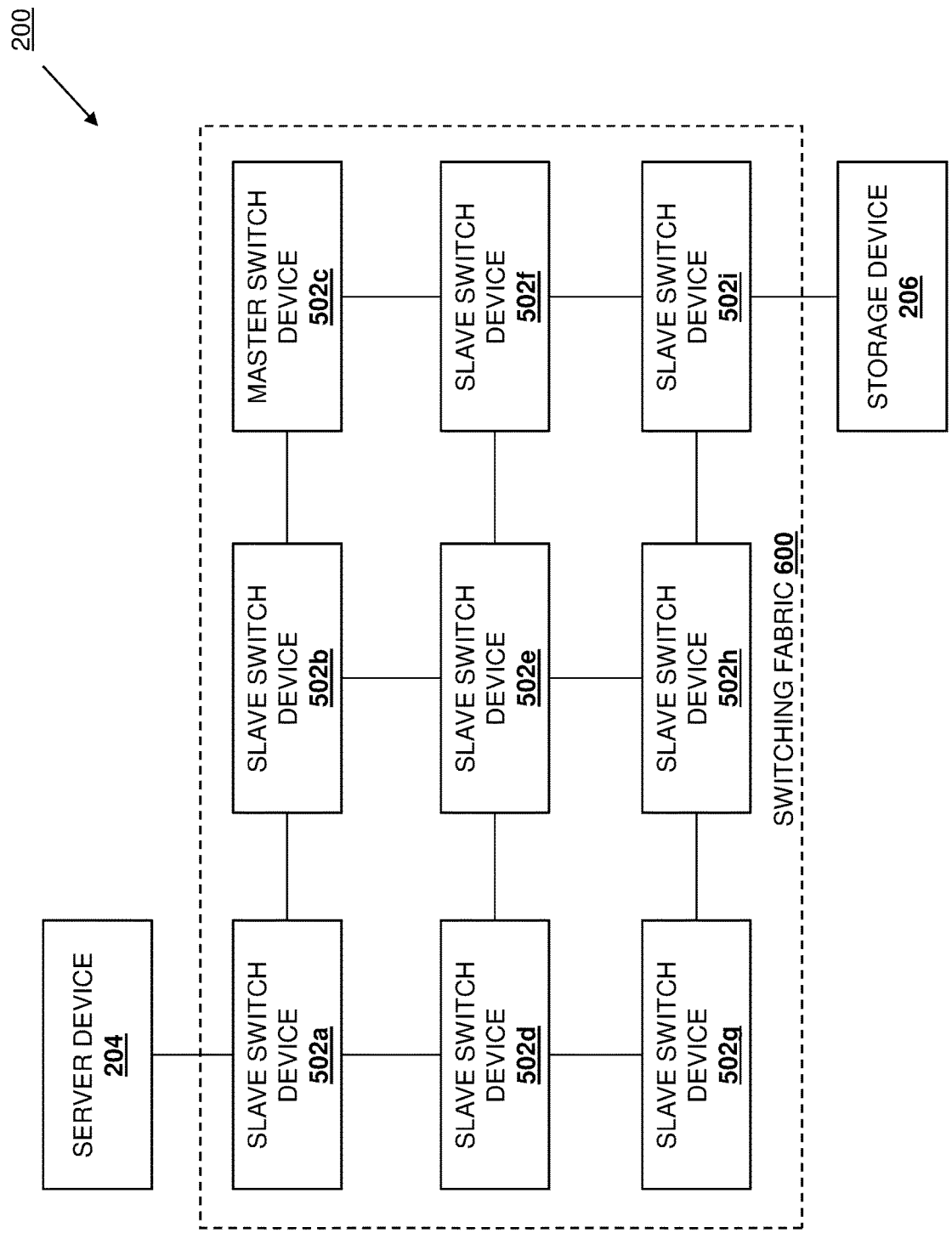
FIG. 6 is a schematic view illustrating an embodiment of the switching fabric configuration and management system of FIG. 2 during the method of FIG. 4.

The method 400 then proceeds to block 408 where the master switch device receives a report of a slave switch device status from each slave switch device. In an embodiment, at block 408, the switching fabric engine 304 in each switch device 502a/300, 502b/300, and 502d-i/300 may operate to report its slave switch device status by, for example, generating a slave switch device status report that is directed to the unique master switch device IP address that was assigned to the master switch device 502c as discussed above, and transmitting the slave switch device status report to that unique master switch device IP address. As such, at block 408, the switching fabric engine 304 in the master switch device 502c receives the slave switch device status report from each of the slave switch devices 502a, 502b, and 502d-i. As illustrated in FIG. 6, and as would be understood by one of skill in the art in possession of the present disclosure, the designation of the master switch device 502c and the slave switch devices 502a, 502b, and 502d-i, along with the reporting of the slave switch device status by each of the slave switch devices 502a, 502b, and 502d-i to the master switch device 502c, allows for the configuration of a switch device cluster by the master switch device 502c that provides a switching fabric 600 that includes that master switch device 502c and those slave switch devices 502a, 502b, and 502d-l, and may include a variety of other operations by the master switch device 502c that provides for the configuration of the switching fabric 600 based on any of a variety of switching fabric policies that would be apparent to one of skill in the art in possession of the present disclosure.

The method 400 then proceeds to block 410 where the master switch device performs at least one control operation on at least one slave switch device. In an embodiment, at block 410 and following the configuration of the switch device cluster that provides the switching fabric 600, the master switch device 502c and the slave switch devices 502a, 502b, and 502d-i may interact in a variety of manners that provides for the management and control of the switch device cluster that provides the switching fabric 600. For example, one of skill in the art in possession of the present disclosure will recognize the master switch device 502c and the slave switch devices 502a, 502b, and 502d-i provided according to the teachings of the present disclosure may synchronize their states using a distributed object model in order to maintain the switch device cluster that provides the switching fabric 600.

In some embodiments, the communications between the master switch device 502c and the slave switch devices 502a, 502b, and 502d-i may be enabled by each switching fabric engine 304 in each of the master switch device 502c/300 and the slave switch devices 502a/300, 502b/300, and 502d-i/300 performing publish/subscribe (pub/sub) operations, which one of skill in the art in possession of the present disclosure will recognize provides a messaging pattern where senders of messages (called publishers) do not program the messages to be sent directly to specific receivers (called subscribers), but instead categorize published messages into classes without knowledge of which subscribers there may be, while subscribers express interest in one or more classes and only receive messages that are of interest, without knowledge of which publishers there are. In a specific example, the pub/sub operations utilized by the master switch device 502c and the slave switch devices 502a, 502b, and 502d-i may be achieved via a conjunction of Control Plane Services (CPS) available in the DELL® OS10 discussed above, and REmote Dictionary Server (REDIS), which is an open-source in-memory data structure project that implements a distributed, in-memory, key-value database with optional durability.

In some embodiments, the master switch device 502c and the slave switch devices 502a, 502b, and 502d-i may perform database sharing in order to share some or all of the contents of their respective switching fabric databases 306, which may be achieved via a conjunction of CPS, REDIS, and application level client synchronization. In a specific example, the master switch device 502c and the slave switch devices 502a, 502b, and 502d-i may perform the pub/sub operations discussed above, along with the utilization of synchronization applications, in order to provide for the sharing of a master switch device configuration file that describes the configuration of the master switch device 502c. For example, the switching fabric engine 304 in the master switch device 502c/300 may retrieve a master switch device configuration file that is stored in its switching fabric database 306, and publish that master switch device configuration file through the communication system 308 for retrieval by each of the slave switch devices 502a, 502b, and 502d-i. As such, the switching fabric engine 304 in each slave switch devices 502a, 502b, and 502d-i may retrieve that master switch device configuration file via its communication system 308 (e.g., via the subscriptions discussed above), and store that master switch device configuration file in its switching fabric database 306. (e.g., "replicating" the master switch device configuration file on each of the slave switch devices 502a, 502b, and 502d-i).

The master switch device configuration file sharing/replication allows for any of the slave switch devices 502a, 502b, and 502d-i to take over in the event the master switch device 502c become unavailable. For example, the switching fabric engine 304 in each slave switch devices 502a, 502b, and 502d-i may be configured to determine that the master switch device 502c (a primary master switch device in this example) is unavailable (e.g., in response to failing to receive regular communications and/or responses from the master switch device 502c) and, in response, retrieve the master switch device configuration file replicated in its switching fabric database 306 as discussed above, and use that master switch device configuration file to configure itself as a master switch device (e.g., a secondary master switch device in this example) that is capable of performing all of the management/control functionality available from the primary master switch device. The determination of which of the slave switch devices 502a, 502b, and 502d-i will take over for an unavailable master switch device may be made based on, for example, the slave switch device with the lowest IP address, keepalived/VRRP master election schemes, and/or a variety of other criteria that would be apparent to one of skill in the art in possession of the present disclosure.

In some embodiments, the switching fabric engine 304 in the master switch device 502c may utilize either or both of the in-band connection 310a and the out-of-band connection 310b provided by its communication system 308 in order to provide for management access and internal operations. For example, the master switch device 502c may be the only switch device in the switch device cluster that provides the switching fabric 600 that is exposed to external management entities such as the server device 204 and storage device 206. The exposure of the master switch device 502c may be enabled by the switching fabric engine 304 in the master switch device 502c exposing a REpresentational State Transfer (REST) Application Programming Interface (API) that allows external entities to access management functionality in the master switch device 502c, which allows control/management/monitoring functionality performed by the master switch device 502c at block 410 to be controlled by a management device. As such, the master switch device 502c may provide a single management "touch point" for the switching fabric 600 using a REST model that may allow in-band or out-of-band management access via, for example, a virtual IP (vIP) address assigned to the master switch device 502c (i.e., a master vIP), and/or physical IP addresses (e.g., IPv6 addresses) assigned to the master switch device 502c and slave switch devices 502a, 502b, and 502d-i. As will be appreciated by one of skill in the art in possession of the present disclosure, the structure of the REST model allows the master switch device 502c to capture the core relationships among the elements in the switching fabric 600.

In some embodiments, the switching fabric engine 304 in the master switch device 502c may maintain the liveliness of each of the slave switch devices 502a, 502b, and 502d-i in order to, for example, enable the determination of when any of the slave switch devices 502a, 502b, and 502d-i become unavailable. Similarly, the switching fabric engine 304 in each of the slave switch devices 502a, 502b, and 502d-i may maintain its own connectivity to the master switch device 502c. As such, the switching fabric engine 304 in the master switch device 502c may listen for events from each of the slave switch devices 502a, 502b, and 502d-i and respond to those events, and the switching fabric engine 304 in each of the slave switch devices 502a, 502b, and 502d-i may listen to events from the master switch device 502c and may separately respond to those events.

In some embodiments, the switch device cluster that provides the switching fabric 600 may support multiple fabrics. For example, as would be understood by one of skill in the art in possession of the present disclosure, ports on different switch devices in the switching fabric 600 may be provided as part of a Link Aggregation Group (LAG) using Virtual Link Trunking (VLT), a proprietary aggregation protocol available from DELL® Inc. of Round Rock, Tex., United States, that provides those switch devices as part of a VLT fabric (i.e., a forwarding fabric) that is supported by the switching fabric 600 (e.g., provided by a switch device cluster/management fabric).

In some embodiments, the forwarding plane provided by the switching fabric 600 does not require special vendor proprietary features from the Network Processing Unit (NPU) that is utilized to provide switching functionality in the switch devices 300. As such, the switching fabric engine 304 may be independent of the NPU (i.e., hardware independent), and may only depend on the operating system that is utilized by the switch device 300 and provided by a Central Processing Unit (CPU) in the switch device 300 that communicates with the NPU via any of a variety of interfaces that would be apparent to one of skill in the art in possession of the present disclosure. Furthermore, the functionality of the master switch device 502c and the slave switch devices 502a, 502b, and 502d-i may be enabled via a modular plug-in architecture and distributed models. In some examples, configurations via of the switch device cluster that provides the switching fabric 600 may be automated in a variety of manners including, for example, a set of policies (e.g., policies to configure server devices in a particular manner when connected to the switching fabric 600 based on, for example, a server device identifier detected in that server device upon its connection to the switching fabric 600) and/or meta data (e.g., fabric mode meta data, attached system discovery identity meta data, etc.) injection.

As such, at block 410, the switching fabric engine 304 in the master switch device 502c may perform any of a variety of control operation on one or more of the slave switch devices 502a, 502b, and 502d-i that may include, for example, configuring a Link Aggregation Group (LAG) using a plurality of ports on one or more of the slave switch devices 502a, 502b, and 502d-i; setting up the forwarding of data traffic on one or more of the slave switch devices 502a, 502b, and 502d-i; providing bindings between ports and VLANs; providing bindings between ports, LAGs, and VLANs; utilizing the Link Aggregation Control Protocol (LACP) on ports; performing physical port configurations such as Maximum Transmission Unit (MTU) configurations and auto-negotiation configurations; providing storage configurations; providing data uplink related configurations such as VLAN configurations, LACP configurations, and LAG configurations; and/or a variety of other control operations that would be apparent to one of skill in the art in possession of the present disclosure.

Thus, systems and methods have been described that provide switching fabrics using a plurality of switch devices that operate to configure themselves into a switching fabric via communications that result in those devices discovering each other and forming a switch device cluster, and then electing one of those switch devices as a master switch device for the switch device cluster/switching fabric such that the remaining switch devices are designated as slave switch devices in the switch device cluster/switching fabric. Following the configuration of the switching fabric, the master switch device may perform control operations on any of the slave switch devices. Furthermore, the master switch device may share its master switch device configuration with each of the slave switch device, which allows any of those slave switch devices to configure themselves as a master switch device in the event the switch device that is operating as the master switch device becomes unavailable. As such, switching fabrics may be configured and managed without the need for an external device with its own Central Processing Unit (CPU), and may instead be configured and managed using the CPU in the switch devices that are already being used to provide the switching fabric. Thus, the configuration of switching fabrics is provided in a manner that reduces the complexity, ongoing operational overhead, and relatively long times required for new system deployment, as well as eliminates the need for to provide a device external to the switching fabric that performs the management and control functionality for the switching fabric, thus reducing the cost of managing and controlling the switching fabric.

Figure 7:
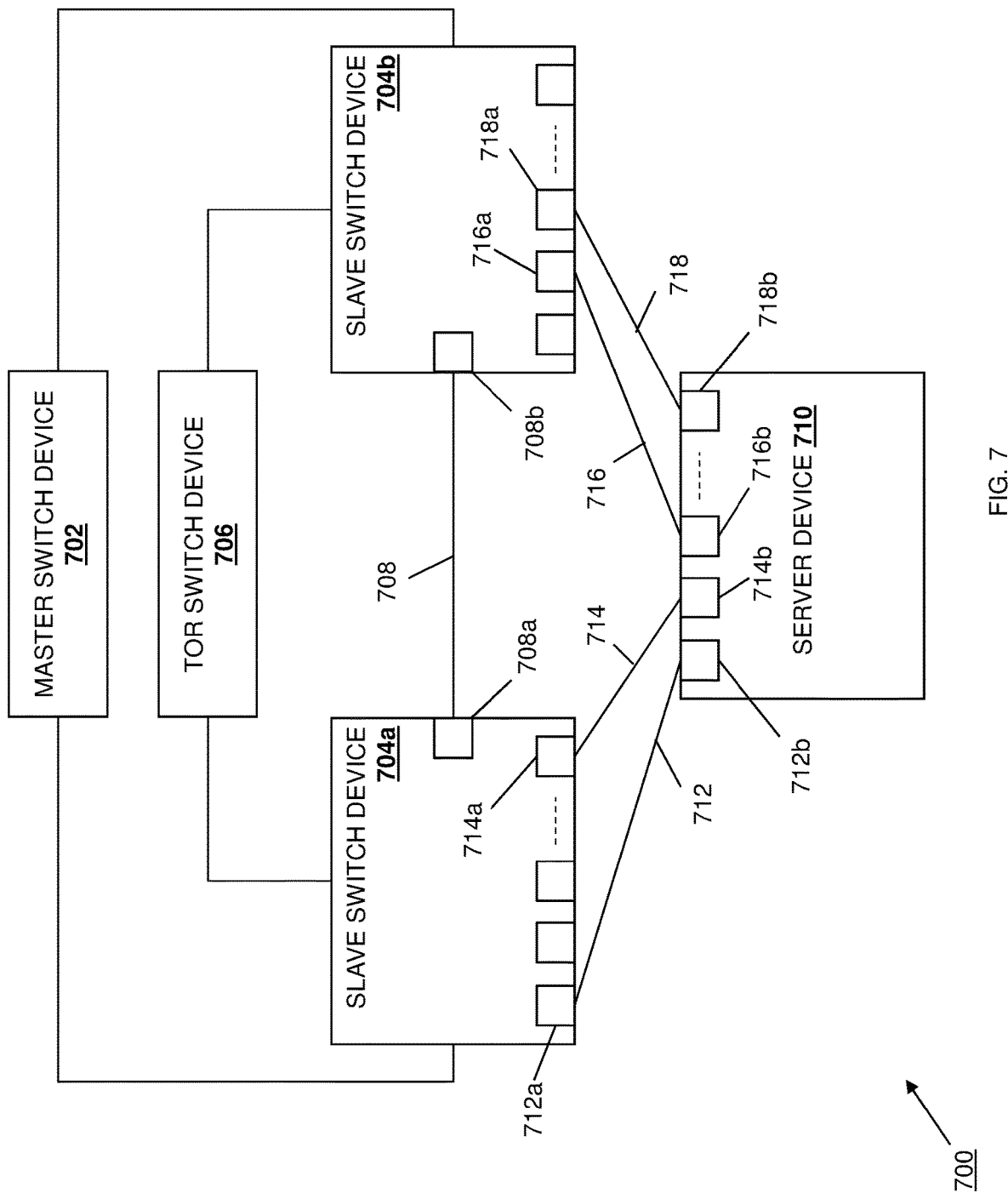
FIG. 7 is a schematic view illustrating an embodiment of a portion of the switching fabric configuration and management system of FIG. 6 providing an automatic LAG configuration system.

In some embodiments, the switching fabric configuration and management system 200 of the present disclosure may be utilized to perform management and control operations on switch devices in the switching fabric 600 such as, for example, configuring Link Aggregation Groups (LAGs) that provide for communication between switch devices in the switching fabric 600 and endhost devices coupled to that switching fabric 600. Referring now to FIG. 7, an embodiment of a portion of the switching fabric configuration and management system 200 of FIG. 6 is illustrated that may be utilized to provide an automatic LAG configuration system 700. In the illustrated embodiment, the automatic LAG configuration system 700 includes a master switch device 700 that may be configured to operate as the master switch device in the manner described above. As such, the master switch device 702 may be provided by the IHS 100 discussed above with reference to FIG. 1, and/or may include some or all of the components of the IHS 100. The master switch device 702 is coupled to a pair of slave switch devices 704a and 704b that may be configured to operate as the slave switch devices in the manner described above. As such, the slave switch devices 704a and 704b may be provided by the IHS 100 discussed above with reference to FIG. 1, and/or may include some or all of the components of the IHS 100. In the specific examples provided below, one of skill in the art in possession of the present disclosure will recognize that the slave switch devices 704a and 704b operate as leaf switch devices, although slave switch devices operating in other roles will fall within the scope of the present disclosure as well. However, while a specific configuration of switch devices is illustrated in FIG. 7, one of skill in the art in possession of the present disclosure will recognize that a variety of switch device may be configured in a variety of manners to provide the automatic LAG configuration system of the present disclosure while remaining within its scope as well. For example, either of the slave switch devices 704a and 704b may be replaced by the master switch device 702, additional slave switch devices may be added to the automatic LAG configuration system 700, the master switch device may operate in the role of leaf switch devices, etc.

In the illustrated embodiment, each of the slave switch devices 704a and 704b are coupled to a Top Of Rack (TOR) switch device 706, which may be provided by the IHS 100 discussed above with reference to FIG. 1, and/or may include some or all of the components of the IHS 100. In addition, the slave switch devices 704a and 704b are coupled together via an Inter-Chassis Link (ICL) 708 that is illustrated as a link provided between respective ports 708a and 708b on the on the slave switch devices 704a and 704b, but one of skill in the art in possession of the present disclosure will recognize that ICLs may be provided using multiple respective aggregated ports on each of the slave switch devices 704a and 704b while remaining within the scope of the present disclosure as well. Furthermore, an endhost device such as the server device 710 illustrated in FIG. 7 is coupled to each of the slave switch devices 704a and 704b. For example, a link 712 is provided between respective ports 712a and 712b on the slave switch device 704a and the server device 710, a link 714 is provided between respective ports 714a and 714b on the slave switch device 704a and the server device 710, a link 716 is provided between respective ports 716a and 716b on the slave switch device 704a and the server device 710, and a link 718 is provided between respective ports 718a and 718b on the slave switch device 704a and the server device 710. However, while a specific coupling configuration is illustrated between the server device 710 and the slave switch devices 704 and 704b, one of skill in the art in possession of the present disclosure will recognize that a variety of couplings may be provided between the server device 710 and the slave switch devices 704 and 704b, and may include additional switch devices, while remaining within the scope of the present disclosure as well.

Figure 8:
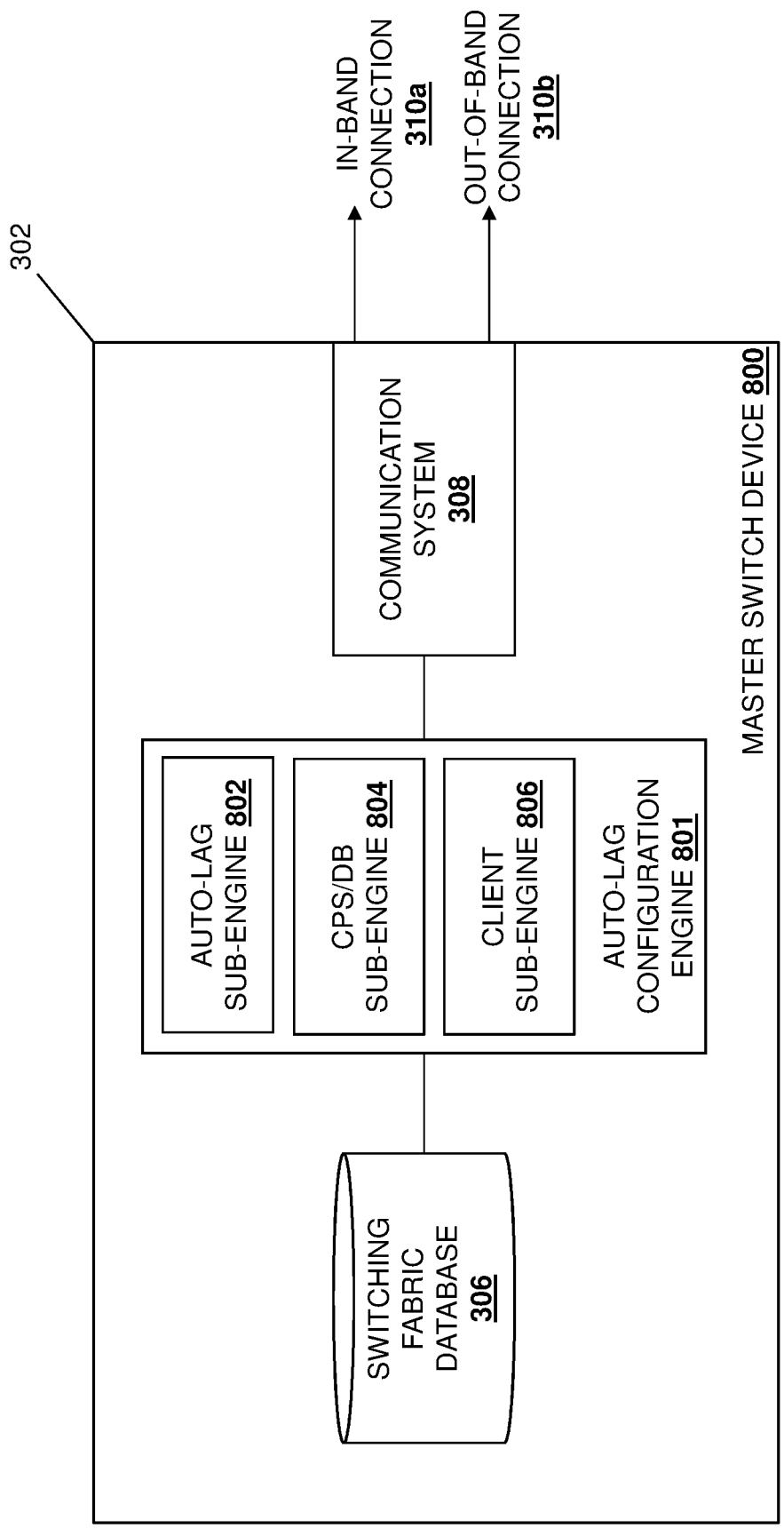
FIG. 8 is a schematic view illustrating an embodiment of the switch device of FIG. 3 that is configured to provide a master switch device in the automatic LAG configuration system of FIG. 7.

Referring now to FIG. 8, an embodiment of a master switch device 800 is illustrated that may provide the master switch device 702 discussed above with reference to FIG. 7, and that includes similar components as the switch device 300 discussed above with reference to FIG. 3. As such, elements numbers for similar components in the switch device 300 and the master switch device 800 are provided with the same reference numbers. As discussed above, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an auto-LAG configuration engine 801 that is configured to perform the functionality of the auto-LAG configuration engines and/or master switch devices discussed below.

In the specific example illustrated in FIG. 8, the switching fabric engine 304 in the switch device 300 has been replaced with the auto-LAG configuration engine 801 in the master switch device 800 that may be provided via the configuration of the switch device 300 as a master switch device in the manner discussed above in order to provide an auto-LAG sub-engine 802 that is configured to perform the functionality of the auto-LAG sub-engines, auto-LAG configuration engines, and/or master switch devices discussed below. In addition, the auto-LAG configuration engine 801 may be provided via the configuration of the switch device 300 as a master switch device in the manner discussed above to provide a Control Plane Services (CPS)/database (DB) sub-engine 804 that is configured to perform the functionality of the CPS/DB sub-engines, auto-LAG configuration engines, and/or master switch devices discussed below. Furthermore, the auto-LAG configuration engine 801 may be provided via the configuration of the switch device 300 as a master switch device in the manner discussed above to provide a client sub-engine 806 that is configured to perform the functionality of the client sub-engines, auto-LAG configuration engines, and/or master switch devices discussed below.

However, while a specific master switch device has been illustrated and described, one of skill in the art in possession of the present disclosure will recognize that master switch devices may include a variety of components and/or component configurations for performing the functionality discussed below while remaining within the scope of the present disclosure.

Figure 9:
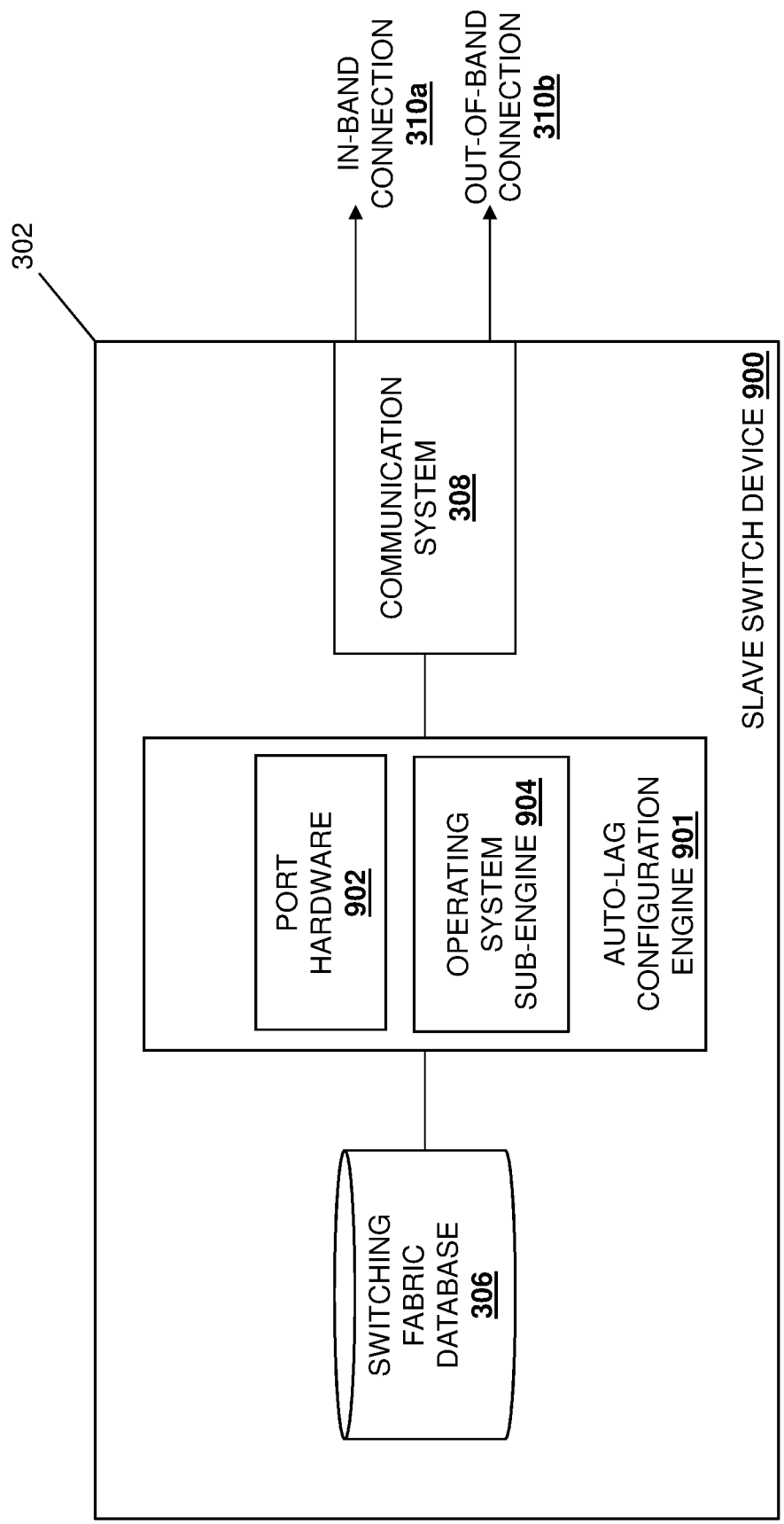
FIG. 9 is a schematic view illustrating an embodiment of the switch device of FIG. 3 that is configured to provide slave switch devices in the automatic LAG configuration system of FIG. 7.

Referring now to FIG. 9, an embodiment of a slave switch device 900 is illustrated that may provide either or both of the slave switch devices 704a and 704b discussed above with reference to FIG. 7, and that includes similar components as the switch device 300 discussed above with reference to FIG. 3. As such, elements numbers for similar components in the switch device 300 and the slave switch device 900 are provided with the same reference numbers. As discussed above, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an auto-LAG configuration engine 901 that is configured to perform the functionality of the auto-LAG configuration engines and/or master switch devices discussed below.

In the specific example illustrated in FIG. 9, the switching fabric engine 304 in the switch device 300 has been replaced with the auto-LAG configuration engine 901 in the slave switch device 900 that may be provided via the configuration of the switch device 300 as a slave switch device in the manner discussed above to provide port hardware 902 that is configured to perform the functionality of the port hardware, auto-LAG configuration engines, and/or slave switch devices discussed below. In addition, the auto-LAG configuration engine 901 may be provided via the configuration of the switch device 300 as a slave switch device in the manner discussed above to provide an operating system sub-engine 904 that is configured to perform the functionality of the operating system sub-engines, auto-LAG configuration engines, and/or master switch devices discussed below. However, while a specific slave switch device has been illustrated and described, one of skill in the art in possession of the present disclosure will recognize that slave switch devices may include a variety of components and/or component configurations for performing the functionality discussed below while remaining within the scope of the present disclosure.

Figure 10:
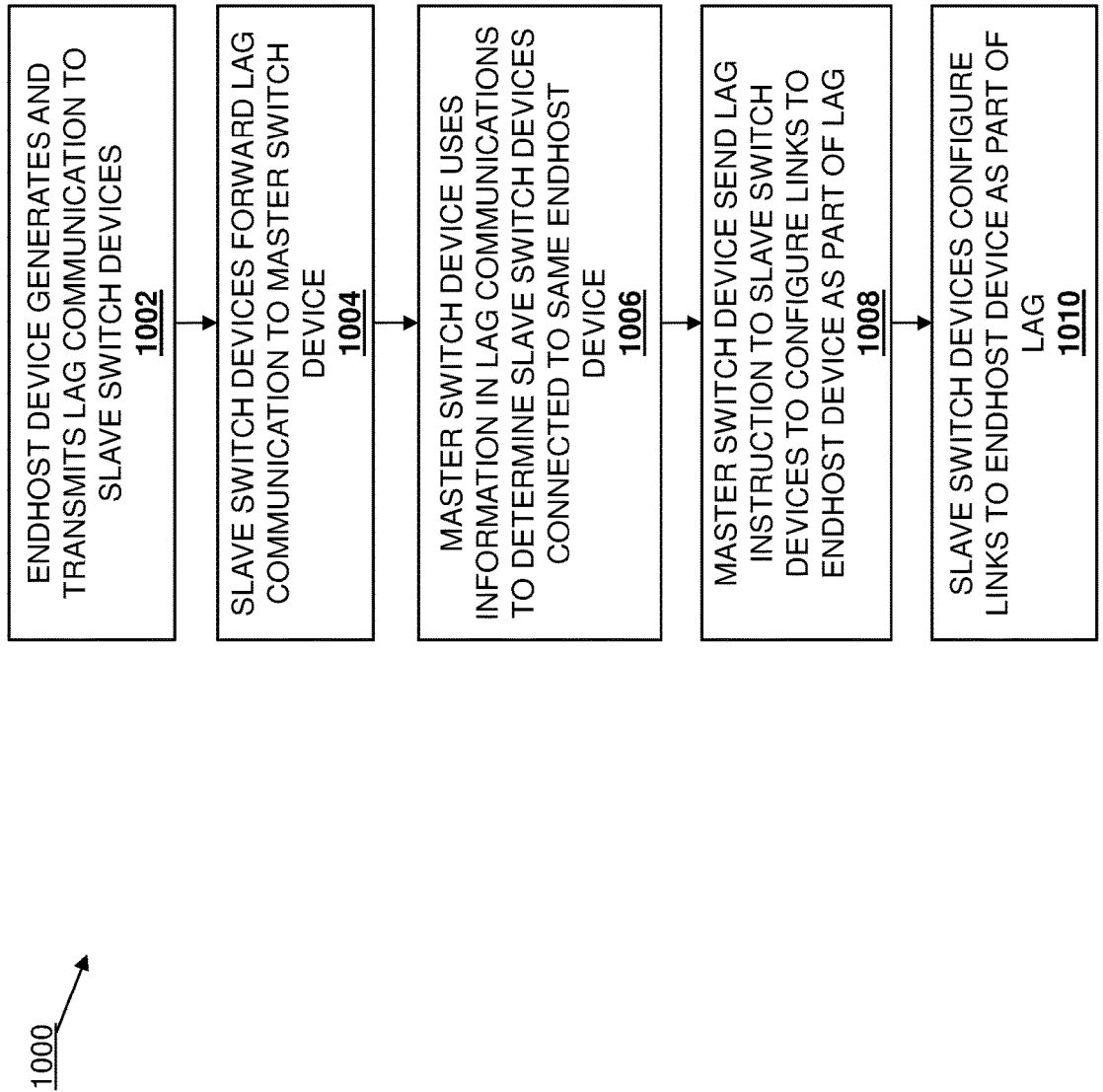
FIG. 10 is a flow chart illustrating an embodiment of a method for automatically configuring a LAG.

Referring now to FIG. 10, an embodiment of a method 1000 for automatically configuring a Link Aggregation Group (LAG) in a switching fabric is illustrated. As discussed below, the systems and methods of the present disclosure provide for the automatic configuration of a LAG between the switching fabric created according to the method 400 discussed above, and an endhost device that is coupled to the switching fabric. For example, the endhost device coupled to the switching fabric may generate and transmit a LAG communication to the slave switch devices in the switching fabric to which it is coupled via at least one link, and each of those slave switch devices may determine that the endhost device is associated with an endhost device profile that provides for automatic configuration of the endhost device. In response, each slave switch device may forward the LAG communication it receives from the endhost device to a master switch device in the switching fabric, and that master switch device may use information in the LAG communications (e.g., the Internet Protocol (IP)

address of the endhost device) to determine that each of the slave switch devices is coupled to the same endhost device. The master switch device will then generate and transmit LAG instructions to each of the slave switch devices, and those slave switch devices will execute their LAG instructions to configure their link(s) to the endhost device as part of a LAG. The master switch device may then manage the LAG for as long as it is used by the endhost device, and may perform operations including removal of the links from the LAG, the addition of other switch devices to the LAG, the addition of endhost devices to a switch device that provides the LAG, and/or any other LAG operations that would be apparent to one of skill in the art in possession of the present disclosure.

The method 1000 begins at block 1002 where an endhost device generates and transmits LAG communications to slave switch devices. In an embodiment, at block 1002, the server device 710 may generate and send a LAG communication provided by, for example, a Link Aggregation Control Protocol (LACP) data packet, to each of the slave switch devices 704a and 704b. For example, the server device 710 may send LACP data packet(s) via the links 712 and/or 714 to the slave switch device 704a, and send LACP data packet(s) via the link(s) 716 and 718 to the slave switch device 704b. As would be understood by one of skill in the art in possession of the present disclosure, LACP data packet(s) sent by the server device 710 may include a server device MAC address for the server device 710, a partner key, and/or other LACP data packet information known in the art. However, while a specific LAG communication has been described, one of skill in the art in possession of the present disclosure will recognize that the LAG communications of the present disclosure may be performed using other protocols and/or techniques while remaining within its scope as well.

The method 1000 then proceeds to block 1004 where the slave switch devices forward the LAG communications from the endhost device to a master switch device. In an embodiment, prior to the method 1000, endhost device profiles may be created (e.g., by a network administrator or other user of the switching fabric 600) and provided to the switch devices in the switching fabric 600 (e.g., for storage in their switching fabric databases 306), with those endhost device profiles defining how associated endhost devices should be treated by the switching fabric 600. For example, a server device profile for the server device 710 may be created and provided on the master switch devices 702, and may identify the server device 710 (e.g., via a server device service tag and Network Interface Controller (NIC) port identifier, and/or a variety of server device identifiers that would be apparent to one of skill in the art in possession of the present disclosure), as well as instruct that the server device 710 should be automatically configured when detected. As such, at block 1004, each of the slave switch devices 704a and 704b may receive the LACP data packet from the server device 710, and provide server device information in that LACP data packet (e.g., server device identifier(s) in the LACP data packet) to the master switch device 702. The master switch device 702 may then match the server device 710 to a server device profile stored in its switching fabric database 306 (via matching server device identifiers that were included in the LACP data packet as well as stored in its switching fabric database 308), and determine the server device profile that instructs that the server device 710 should be automatically configured.

The method 1000 then proceeds to block 1006 where the master switch device uses information in the LAG communications to determine slave switch devices that are connected to the endhost device. In an embodiment, at block 1006, the auto-LAG configuration engine 801 in the master switch device 702/800 operates to determine that the slave switch devices 704a and 704b are each connected to the server device 710 by determining that the LACP data packet(s) forwarded by the slave switch device 704a at block 1004 include the server device IP address of the server device 710, and the LACP data packet(s) forwarded by the slave switch device 704b at block 1004 includes the server device IP address of the server device 710. As such, based on the detection of the server device IP address of the server device 710 in the LACP data packets forwarded by both of the slave switch devices 704a and 704b at block 1004, the auto-LAG configuration engine 801 in the master switch device 702/800 may conclude that each of the slave switch devices 704a and 704b are connected to the server device 710. However, while a specific technique for determining that switch devices in a switching fabric are connected to a common endhost device, one of skill in the art in possession of the present disclosure will recognize that other techniques for detecting the connection of multiple switch devices to the same endhost device will fall within the scope of the present disclosure as well.

In some embodiments, the determination by the auto-LAG configuration engine 801 in the master switch device 702/800 that the slave switch devices 704a and 704b are connected to the same server device 710 may be followed by the auto-LAG configuration engine 801 in the master switch device 702/800 performing a variety of operations that prepare for the creation of a LAG and/or create LAG instruction(s) that are configured to cause the slave switch devices 704a and 704b to create a LAG. For example, following the determination that the slave switch devices 704a and 704b are connected to the same server device 710, the auto-LAG configuration engine 801 in the master switch device 702/800 may operate to determine whether a LAG has already been created between the server device 710 and slave switch devices 704a and 704b and, if not, may operate to instantiate an LACP session and assign a LAG identifier to that LACP session. In another example, following the determination that the slave switch devices 704a and 704b are connected to the same server device 710, the auto-LAG configuration engine 801 in the master switch device 702/800 may generate a single switch device identity such as, for example, a MAC address, for use by the slave switch devices 704a and 704b in communicating with the server device 710.

In a specific example, the MAC address generated for use by the slave switch devices 704a and 704b in communicating with the server device 710 may be associated with a Virtual Link Trunking (VLT) fabric that is to be provided by the slave switch devices 704a and 704b. As would be understood by one of skill in the art in possession of the present disclosure, VLT is proprietary aggregation protocol available from DELL® Inc. of Round Rock, Tex., United States, and operates to provide a layer 2 (L2) link aggregation protocol between endhost devices (e.g., the server device 710) connected to different switch devices (e.g., the slave switch devices 704a and 704b) that provides a redundant, load-balancing connection to the switching fabric in a loop-free environment that does not require the Spanning Tree Protocol (STP). The auto-LAG configuration engine 801 in the master switch device 702/800 may then generate instructions for configuring the slave switch devices 704a and 704b to utilize the MAC address as part of the VLT fabric in order to present themselves as single switch device.

Continuing the example of embodiments in which a VLT fabric is to be provided by the slave switch devices 704*a* and 704*b*, the LAG instruction(s) generated by the auto-LAG configuration engine 801 in the master switch device 702/800 may include information for configuring a first LACP LAG and adding the ports 712*a* and 714*a* on the slave switch device 704*a* to that first LACP LAG, information for configuring a second LACP LAG and adding the ports 716*a* and 718*a* on the slave switch device 704*b* to that second LACP LAG, information for configuring the ICL 708 between the slave switch devices 704*a* and 704*b*, information for creating a VLT LAG, information for adding the first LACP LAG and the second LACP LAG to the VLT LAG, information for adding Virtual Local Area Networks (VLANs) to each of the LAG interfaces (e.g., the ports 712*a*, 714*a*, 716*a*, and 718*a*) on the slave switch devices 704*a* and 704*b*, and/or any other information that would be apparent to one of skill in the art in possession of the present disclosure. However, while specific examples of operations performed by the auto-LAG configuration engine 801 in the master switch device 702/800 to prepare for the creation of a LAG, and/or to create LAG instruction(s) that are configured to cause the slave switch devices 704*a* and 704*b* to create a LAG, have been described, one of skill in the art in possession of the present disclosure will recognize that other operations for preparing for the creation of a LAG and/or creating the LAG instruction(s) of the present disclosure will fall within its scope as well.

The method 1000 then proceeds to block 1008 where the master switch device sends LAG instructions to the slave switch devices to configure their links to the endhost device as part of a LAG. In an embodiment, at block 1008, the auto-LAG configuration engine 801 in the master switch device 702/800 transmits the LAG instruction(s) via its communication system 308 to each of the slave switch devices 704*a* and 704*b* using, for example, LACP data packets. As such, at block 1008, the auto-LAG configuration engine 901 in each of the slave switch devices 704*a*/900 and 704*b*/900 may receive the LACP data packet(s) including the LAG instructions via its communication system 308.

Figure 11:
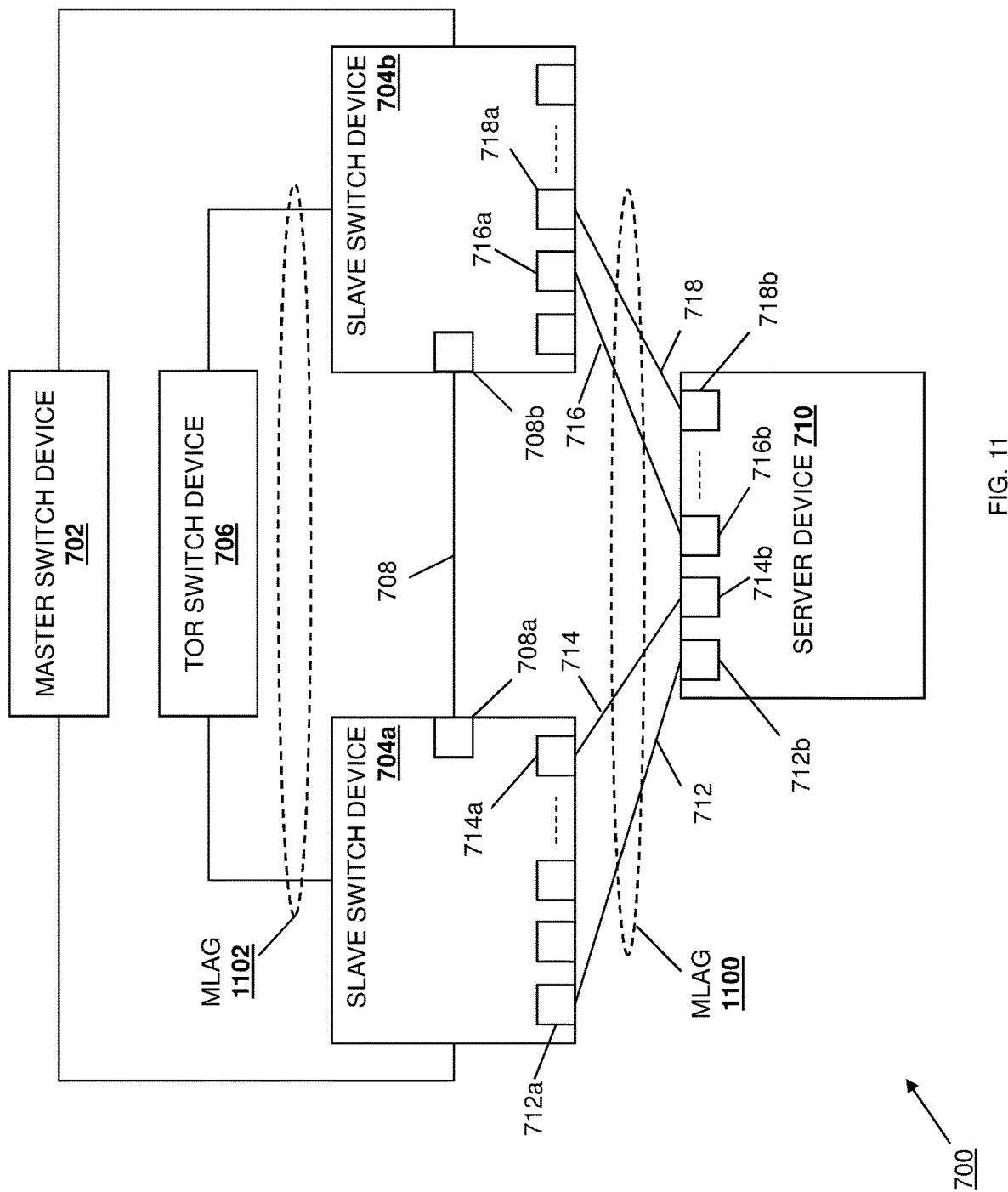
FIG. 11 is a schematic view illustrating an embodiment of the automatic LAG configuration system of FIG. 7 following the method of FIG. 10.

The method 1000 then proceeds to block 1010 where the slave switch devices configure their links to the endhost device as part of a LAG. In an embodiment, at block 1010, the auto-LAG configuration engine 901 in each of the slave switch devices 704*a*/900 and 704*b*/900 operate to execute the LAG instruction(s) received in the LACP data packets from the master switch device 702 in order to configure a LAG. For example, the auto-LAG configuration engine 901 in the slave switch device 704*a*/900 may operate to execute the LAG instruction(s) received in the LACP data packet(s) from the master switch device 702 in order to configure its ports 712*a* and 714*a* that provide each of the links 712 and 714, respectively, as part of a LAG, and the auto-LAG configuration engine 901 in the slave switch device 704*b*/900 may operate to execute the LAG instruction(s) received in the LACP data packet(s) from the master switch device 702 in order to configure its ports 716*a* and 718*a* that provide each of the links 716 and 718 as part of the LAG. In addition, the slave switch devices 704*a* and 704*b* may communicate with the server device 710 to cause the server device 710 to configure its ports 712*b*, 714*b*, 716*b*, and 718*b* that provides the links 712, 714, 716, and 718, respectively, as part of the LAG. With reference to FIG. 11, a Multi-chassis Link Aggregation Group (MLAG) 1100 is illustrated that includes the links 712 and 714 between the server device 710 and the slave switch device 704*a*, and the links 716 and 718 between the server device 710 and the slave switch device 704*b*. While not described in detail, one of skill in the art in possession of the present disclosure will recognize that an MLAG 1102 between the TOR switch device 706 and the slave switch devices 704*a* and 704*b* may be configured in substantially the same manner as described above for the MMLAG 1100.

As would be understood by one of skill in the art in possession of the present disclosure, following the creation of the MLAG 1100, the slave switch devices 704*a* and 704*b* may communicate with the server device 710 using the common MAC address discussed above, which causes those communications to appear to the server device 710 to be coming from a single switch device. Furthermore, following the configuration of the MLAG 1100, the auto-LAG configuration engine 801 in the master switch device 702/800 may operate manage the MLAG 1100 for the life of the server device 710. For example, the auto-LAG configuration engine 801 in the master switch device 702/800 may detect movement of the server device 710 (e.g., from the slave switch devices 704*a* and 704*b* to different switch devices that provide the switching fabric 600), a replacement of the server device 710 (e.g., the connection of a different server device to the slave switch devices 704*a* and 704*b* in place of the server device 710), addition of a server device (e.g., to the slave switch devices 704*a* and 704*b*), removal of the server device 710 (e.g., disconnection of the server device 710 from the slave switch devices 704*a* and 704*b*), removal of the LAG, and/or other occurrences associated with the MLAG 1100 and, in response, perform management operations. For example, in the event the server device 710 is removed from the slave switch devices 704*a* and 704*b*, the auto-LAG configuration engine 801 in the master switch device 702/800 may detect that removal of the server device 710 (e.g., via communications from the slave switch devices 704*a* and 704*b*), and send a LAG removal instruction to each of the slave switch devices 704*a* and 704*b* that causes the links 712, 714, 716, and 718 that couple the slave switch devices 704*a* and 704*b* to the server device 710 to be removed from the MLAG 1100. However, while a specific management operation has been described, one of skill in the art in possession of the present disclosure will recognize that other management operations will fall within the scope of the present disclosure as well.

Figure 12:
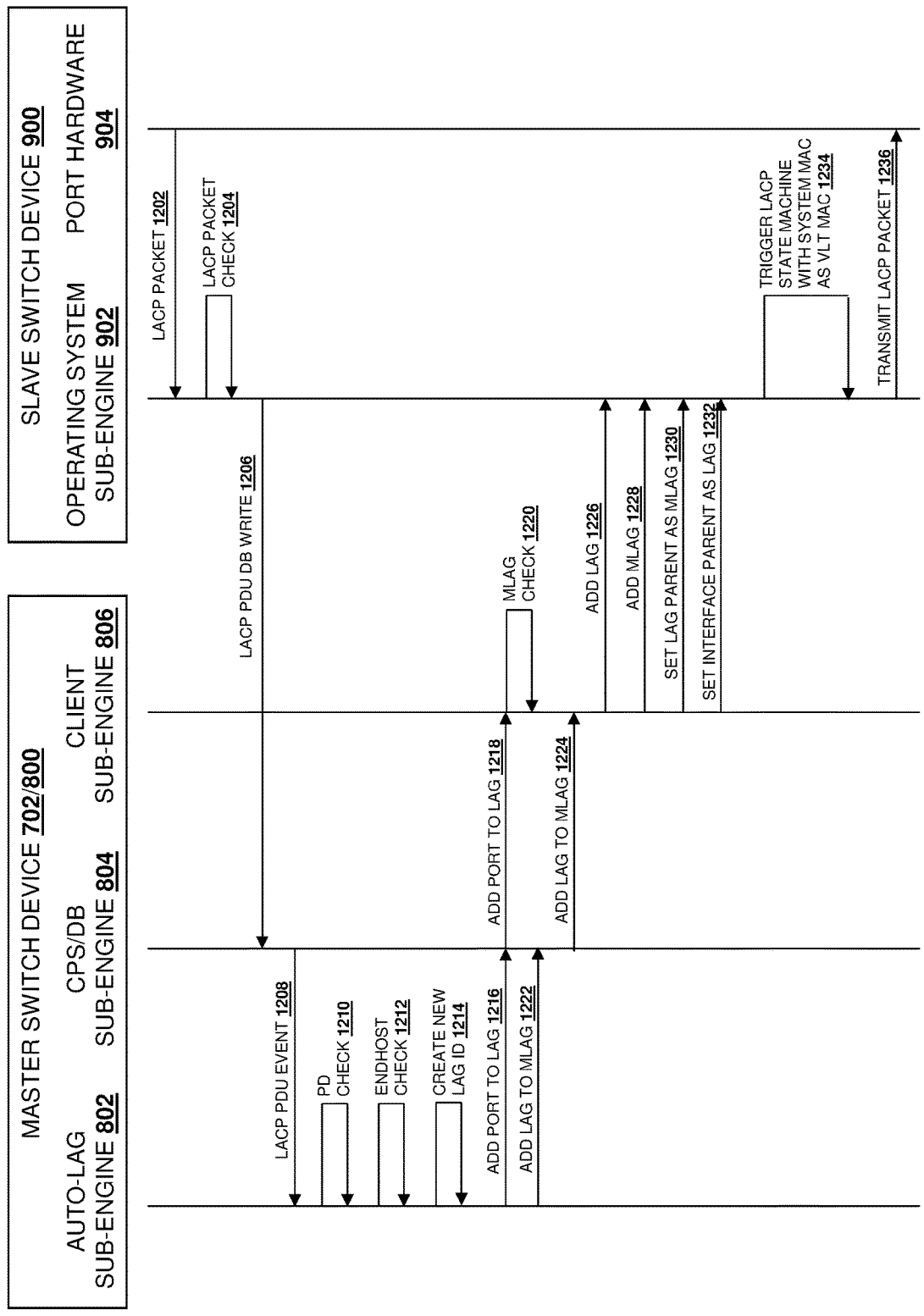
FIG. 12 is a swim-lane diagram illustrating an embodiment of communications provided between a master switch device and a slave switch device during the method of FIG. 10.

Referring now to FIG. 12, a swim-lane diagram 1200 illustrates the auto-LAG configuration of the present disclosure when an endhost device is connected to the switching fabric 600. As can be seen, an LACP packet 1202 received from a newly connected endhost device at the port hardware 904 included on the slave switch device 900 is provided to the operating system sub-engine 902 included in the slave switch device 900, and the operating system sub-engine 902 performs an LACP packet check 1204 to determine whether the LACP packet should be sent to the master switch device 702/800. For example, the LACP packet check 1204 may cause the LACP packet to be sent to the master switch device 702/800 if the port on which the LACP packet was received is not part of a LAG, or if there is any change in status of that port. Otherwise, the operating system sub-engine 902 in the slave switch device 900 may consume the LACP packet. If the LACP packet check 1204 results in a determination to send the LACP packet to the master switch device 702/800, the operating system sub-engine 902 performs an LACP Protocol Data Unit (PDU) database write 1206 to the CPS/DB sub-engine 804 in the master switch device 702/800, which causes the CPS/DB sub-engine 804 to send an LACP PDU event 1208 to the auto-LAG sub-engine 802 in the master switch device 702/800. The auto-LAG sub-engine 802 then performs a PDU check 1210 to determine whether the PDU is valid, and an endhost check 1212 to determine whether the endhost device is known.

In this example, the endhost device is a new device connected to the switching fabric 600, so the endhost device is not known and the auto-LAG sub-engine 802 creates a new LAG identifier 1214, and sends an instruction 1216 to the CPS/DB sub-engine 804 to add a port to the LAG. The CPS/DB sub-engine 804 then sends an instruction 1216 to the client sub-engine 806 to add a port to the LAG. The client sub-engine 806 then performs an MLAG check 1220 to determine whether an MLAG exists and, if so, the auto-LAG sub-engine 802 sends an instruction 1222 to the CPS/DB sub-engine 804 to add the LAG to that MLAG. The CPS/DB sub-engine 804 then sends an instruction 1224 to the client sub-engine 806 to add the LAG to that MLAG. The client sub-engine 806 then sends an instruction 1226 to the operating system sub-engine 902 in the slave switch device 900 to add a LAG, an instruction 1228 to add an MLAG 1228, an instruction 1230 to set a LAG parent as the MLAG, and an instruction 1232 to set an interface parent as the LAG. The operating system sub-engine 902 in the slave switch device 900 then triggers an LACP state machine 1234 (e.g., with a system MAC as a VLT MAC), and transmits an LACP packet 1236 via the port hardware 904 to the endhost device.

Figure 13:
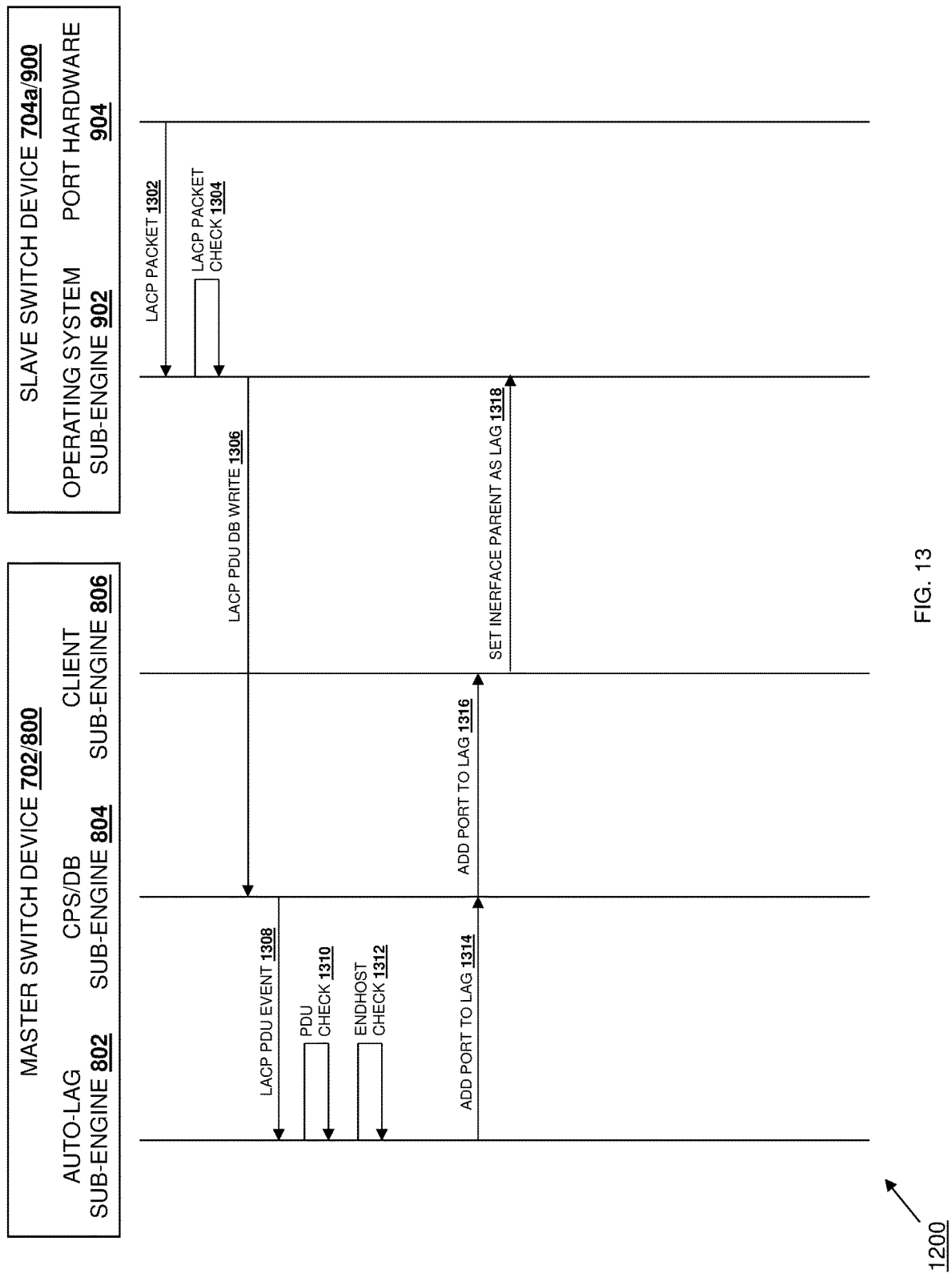
FIG. 13 is a swim-lane diagram illustrating an embodiment of communications provided between a master switch device and a slave switch device during the method of FIG. 10.

Referring now to FIG. 13, a swim-lane diagram 1300 illustrates the auto-LAG configuration of the present disclosure when an endhost device has already been discovered as connected to the switching fabric 600 via the slave switch device 704a/900 (e.g., in the manner discussed above with reference to FIG. 12). As can be seen, an LACP packet 1302 received from the previously discovered endhost device at the port hardware 904 included on the slave switch device 900 is provided to the operating system sub-engine 902 included in the slave switch device 900, and the operating system sub-engine 902 performs an LACP packet check 1304 to determine whether the LACP packet should be sent to the master switch device 702/800. For example, the LACP packet check 1304 may cause the LACP packet to be sent to the master switch device 702/800 if the port on which the LACP packet was received is not part of a LAG, or if there is any change in status of that port. Otherwise, the operating system sub-engine 902 in the slave switch device 900 may consume the LACP packet.

If the LACP packet check 1304 results in a determination to send the LACP packet to the master switch device 702/800, the operating system sub-engine 902 performs an LACP PDU database write 1306 to the CPS/DB sub-engine 804 in the master switch device 702/800, which causes the CPS/DB sub-engine 804 to send an LACP PDU event 1308 to the auto-LAG sub-engine 802 in the master switch device 702/800. The auto-LAG sub-engine 802 then performs a PDU check 1310 to determine whether the PDU is valid, and an endhost check 1312 to determine whether the endhost device is known. In this example, the endhost device was previously discovered as connected to the switching fabric 600 via the slave switch device 704a/900, so the endhost device is known and the auto-LAG sub-engine 802 sends an instruction 1314 to the CPS/DB sub-engine 804 to add a port to the LAG. The CPS/DB sub-engine 804 then sends an instruction 1316 to the client sub-engine 806 to add the port to the LAG. The client sub-engine 806 then sends an instruction 1318 to the operating system sub-engine 902 in the slave switch device 900 to set an interface parent as the LAG.

Figure 14:
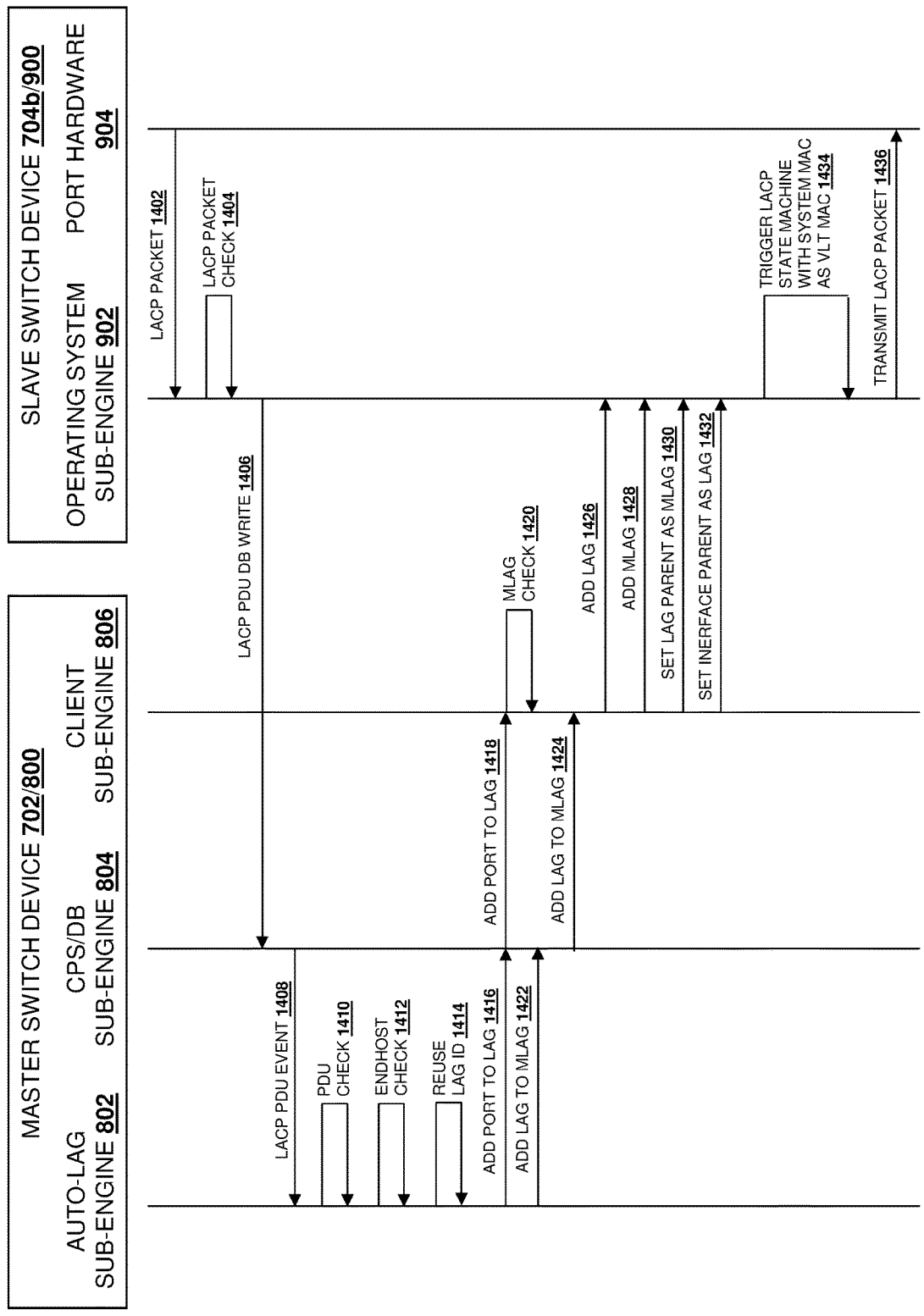
FIG. 14 is a swim-lane diagram illustrating an embodiment of communications provided between a master switch device and a slave switch device during the method of FIG. 10.

Referring now to FIG. 14, a swim-lane diagram 1400 illustrates the auto-LAG configuration of the present disclosure when the endhost device that is connected to the slave switch device 704a/900 in the switching fabric 600 (as discussed with reference to FIG. 13) is then connected to the slave switch device 704b/900 in the switching fabric 600. As can be seen, an LACP packet 1402 received from the endhost device at the port hardware 904 included on the slave switch device 900 is provided to the operating system sub-engine 902 included in the slave switch device 900, and the operating system sub-engine 902 performs an LACP packet check 1404 to determine whether the LACP packet should be sent to the master switch device 702/800. For example, the LACPU packet check 1404 may cause the LACP packet to be sent to the master switch device 702/800 if the port on which the LACP packet was received is not part of a LAG, or if there is any change in status of that port. Otherwise, the operating system sub-engine 902 in the slave switch device 900 may consume the LACP packet. If the LACPU packet check 1404 results in a determination to send the LACP packet to the master switch device 702/800, the operating system sub-engine 902 performs an LACP PDU database write 1406 to the CPS/DB sub-engine 804 in the master switch device 702/800, which causes the CPS/DB sub-engine 804 to send an LACP PDU event 1408 to the auto-LAG sub-engine 802 in the master switch device 702/800. The auto-LAG sub-engine 802 then performs a PDU check 1410 to determine whether the PDU is valid, and an endhost check 1412 to determine whether the endhost device is known.

In this example, the endhost device was previously discovered as connected to the switching fabric 600 via the slave switch device 704b/900, so the endhost device is known and the auto-LAG sub-engine 802 reuses the LAG identifier 1414 that was created for the LAG provided for the switch device 704a/900, and sends an instruction 1416 to the CPS/DB sub-engine 804 to add a port to the LAG. The CPS/DB sub-engine 804 then sends an instruction 1418 to the client sub-engine 806 to add a port to the LAG. The client sub-engine 806 then performs an MLAG check 1420 to determine whether an MLAG exists and, if so, the auto-LAG sub-engine 802 sends an instruction 1422 to the CPS/DB sub-engine 804 to add the LAG to that MLAG. The CPS/DB sub-engine 804 then sends an instruction 1424 to the client sub-engine 806 to add the LAG to that MLAG. The client sub-engine 806 then sends an instruction 1426 to the operating system sub-engine 902 in the slave switch device 900 to add a LAG, an instruction 1428 to add an MLAG, an instruction 1430 to set a LAG parent as the MLAG, and an instruction 1432 to set an interface parent as the LAG. The operating system sub-engine 902 in the slave switch device 900 then triggers an LACP state machine 1434 (e.g., with a system MAC as a VLT MAC), and transmits an LACP packet 1436 via the port hardware 904 to the endhost device.

Thus, systems and methods have been described that provide for the automatic configuration of a LAG between a switching fabric and an endhost device. The endhost device coupled to the switching fabric may generate and transmit an LACP data packet to the slave switch devices in the switching fabric to which it is coupled via at least one link, and each of those slave switch devices may determine that the endhost device is associated with an endhost device profile that provides for automatic configuration of the endhost device. In response, each slave switch device may forward the LACP data packet it receives from the endhost device to a master switch device in the switching fabric, and that master switch device may use information in the LACP data packet (e.g., the Internet Protocol (IP) address of the endhost device) to determine that each of the slave switch devices is coupled to the same endhost device. The master switch device will then generate and transmit LAG instructions to each of the slave switch devices, and those slave switch devices will execute their LAG instructions to configure their link(s) to the endhost device as part of a LAG. The master switch device may then manage the LAG for as long as it is used by the endhost device, and may perform operations including removal of the links from the LAG, the addition of other switch devices to the LAG, the addition of endhost devices to a switch device that provides the LAG, and/or any other LAG operations that would be apparent to one of skill in the art in possession of the present disclosure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An automated link aggregation system, comprising:
   a networked device;
   a plurality of first networking devices that are each coupled to the networked device by at least one respective link, wherein each of the plurality of first networking devices are configured to:
     receive a link aggregation communication from the networked device; and
     forward networked device information in that link aggregation communication; and
   a second networking device that manages each of the plurality of first networking devices, wherein the second networking device is configured to:
     receive networked device information from each of the plurality of first networking devices;
     determine, based on the networked device information, that each of the plurality of first networking devices are coupled to the networked device; and
     send a link aggregation instruction to each of the plurality of first networking devices that causes the at least one respective link that couples each of the plurality of first networking devices to the networked device to be aggregated.

2. The system of claim 1, wherein second networking device is configured to:
   determine, using the networked device information, that the networked device is associated with a networked device profile that provides for automatic configuration of the networked device.

3. The system of claim 1, wherein the second networking device manages the plurality of first networking devices based on election operations performed by the second networking device and the plurality of first networking devices.

4. The system of claim 1, wherein the second networking device is configured to:
   determine that each of the plurality of first networking devices are coupled to the networked device based on the networked device information that includes an address of the networked device.

5. The system of claim 1, wherein the second networking device is configured to:
   send a link aggregation removal instruction to each of the plurality of first networking devices that causes the at least one respective link that couples each of the plurality of first networking devices to the networked device to be de-aggregated.

6. The system of claim 1, wherein the second networking switch device is configured to:
   determine a common Media Access Control (MAC) address; and
   provide the common MAC address to each of the plurality of first networking devices in the link aggregation instruction in order to cause each of the plurality of first networking devices to communicate with the networked device using the common MAC address and via at least one of the respective links that were aggregated.

7. The system of claim 1, wherein at least one link couples the second networking device to the networked device, wherein the second networking device is configured to:
   aggregate the at least one link that couples the second networking device to the networked device with each at least one respective link that couples each of the plurality of first networking devices to the networked device.

8. An Information Handling System (IHS), comprising:
   a processing system; and
   a memory system that is coupled to the processing system and that includes instructions that, when executed by the processing system, cause the processing system to provide a link aggregation configuration engine that is configured to:
     receive, from each of a plurality of networking devices that are managed by the Information Handling System (IHS), networked device information received in respective link aggregation communications that were each generated and transmitted by a networked device that is coupled to each of the plurality of networking devices via at least one respective link;
     determine, based on the networked device information, that each of the plurality of networking devices are coupled to the networked device; and
     send, to each of the plurality of networking devices, a link aggregation instruction that causes the at least one respective link that couples each of the plurality of networking devices to the networked device to be aggregated.

9. The IHS of claim 8, wherein the plurality of networking devices are managed by the IHS based on election operations performed by the IHS and the plurality of networking devices.

10. The IHS of claim 8, wherein the link aggregation configuration engine is configured to:
    determine that each of the plurality of networking devices are coupled to the networked device based on the networked device information that includes an address of the networked device.

11. The IHS of claim 8, wherein the link aggregation configuration engine is configured to:
    send, to each of the plurality of networking devices, a link aggregation removal instruction that causes the at least one respective link that couples each of the plurality of networking devices to the networked device to be de-aggregated.

12. The IHS of claim 8, wherein the link aggregation configuration engine is configured to:
    determine a common Media Access Control (MAC) address; and
    provide, to each of the plurality of networking devices, the common MAC address in the link aggregation instruction in order to cause each of the plurality of networking devices to communicate with the networked device using the common MAC address and via at least one of the respective links that were aggregated.

13. The IHS of claim 8, further comprising:
at least one port that is coupled to the processing system and to at least one link to the networked device, wherein the link aggregation configuration engine is configured to:
aggregate the at least one link that is coupled to the at least one port with each at least one respective link that couples each of the plurality of first networking devices to the networked device.

14. A method for automatically configuring a link aggregation, comprising:
receiving, by a second networking device from each of a plurality of first networking devices that are managed by the second networking device, networked device information received in respective link aggregation communications that were each generated and transmitted by a networked device that is coupled to each of the plurality of first networking devices via at least one respective link;
determining, by the second networking device based on the networked device information, that each of the plurality of first networking devices are coupled to the networked device; and
sending, by the second networking device to each of the plurality of first networking devices, a link aggregation instruction that causes the at least one respective link that couples each of the plurality of first networking devices to the networked device to be aggregated.

15. The method of claim 14, further comprising:
determining, by the second networking device, that the networked device is associated with a networked device profile that provides for automatic configuration of the networked device.

16. The method of claim 14, wherein the plurality of first networking devices are managed by the second networking device based on election operations performed by the second networking device and the plurality of first networking devices.

17. The method of claim 14, further comprising:
determining, by the second networking device, that each of the plurality of first networking devices are coupled to the networked device based on the networked device information that includes an address of the networked device.

18. The method of claim 14, further comprising:
sending, by the second networking device to each of the plurality of first networking devices, a link aggregation removal instruction that causes the at least one respective link that couples each of the plurality of first networking devices to the networked device to be de-aggregated.

19. The method of claim 14, further comprising:
determining, by the second networking device, a common Media Access Control (MAC) address; and
providing, by the second networking device to each of the plurality of first networking devices, the common MAC address in the link instruction in order to cause each of the plurality of first networking devices to communicate with the networked device using the common MAC address and via at least one of the respective links that were aggregated.

20. The method of claim 14, further comprising:
aggregating, by the second networking device, at least one link that couples the second networking device to the networked device with each at least one respective link that couples each of the plurality of first networking devices to the networked device.

* * * * *